(12) United States Patent
Nishiyama et al.

(10) Patent No.: US 10,372,297 B2
(45) Date of Patent: Aug. 6, 2019

(54) IMAGE CONTROL METHOD AND DEVICE

(71) Applicant: FUJITSU LIMITED, Kawasaki-shi, Kanagawa (JP)

(72) Inventors: Soichi Nishiyama, Ota (JP); Hiroaki Sugimura, Ota (JP); Ken Fujiki, Kawasaki (JP); Hajime Hirozumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 15/585,325

(22) Filed: May 3, 2017

(65) Prior Publication Data

US 2017/0329470 A1    Nov. 16, 2017

(30) Foreign Application Priority Data

May 11, 2016    (JP) .................................. 2016-095505

(51) Int. Cl.
*G06F 3/01*    (2006.01)
*G06F 3/14*    (2006.01)
(Continued)

(52) U.S. Cl.
CPC ............ *G06F 3/0482* (2013.01); *G06F 3/011* (2013.01); *G06F 3/017* (2013.01);
(Continued)

(58) Field of Classification Search
CPC ......... G06F 3/0482; G06F 3/011; G06F 3/017
See application file for complete search history.

(56) References Cited

U.S. PATENT DOCUMENTS

2002/0077882 A1    6/2002  Nishikawa et al.
2010/0211439 A1*   8/2010  Marci .................... G06Q 10/10
                                                    705/7.29
(Continued)

FOREIGN PATENT DOCUMENTS

JP    2001-60194 A     3/2001
JP    2002-108946 A    4/2002
WO    2014/085910 A1   6/2014

OTHER PUBLICATIONS

Office Action dated Aug. 9, 2018, issued in counterpart European Application No. 17170382.0. (7 pages).
(Continued)

*Primary Examiner* — Angie Badawi
(74) *Attorney, Agent, or Firm* — Westerman, Hattori, Daniels & Adrian, LLP

(57) ABSTRACT

An image control method includes referencing a first storage section where selection option information, for which a selection operation is received on a display device, is stored in association with a selection timing, and a second storage section where detection information, detected by a detection device that detects at least one of a state of a area at which the display device is disposed or a state of a user, is stored in association with detection time information; and identifying an item of selection option information stored at the first storage section in association with a timing that corresponds to the time information stored at the second storage section in association with detection information indicating a predetermined state; and effecting control so as to display the identified item of selection option information on the display device using a different display mode from that of other displayed selection option information.

19 Claims, 25 Drawing Sheets

(51) Int. Cl.
*G06F 3/16* (2006.01)
*G06F 16/51* (2019.01)
*G06Q 30/02* (2012.01)
*G06T 11/20* (2006.01)
*G06F 3/0482* (2013.01)
*G06F 3/0484* (2013.01)

(52) U.S. Cl.
CPC ........ *G06F 3/04842* (2013.01); *G06F 3/1454* (2013.01); *G06F 3/167* (2013.01); *G06F 16/51* (2019.01); *G06Q 30/0201* (2013.01); *G06Q 30/0203* (2013.01); *G06T 11/206* (2013.01); *G06T 2200/24* (2013.01)

(56) References Cited

U.S. PATENT DOCUMENTS

| | | | | |
|---|---|---|---|---|
| 2012/0060094 | A1* | 3/2012 | Irwin | H04N 21/4314 715/719 |
| 2014/0223462 | A1* | 8/2014 | Aimone | A61B 5/0476 725/10 |

OTHER PUBLICATIONS

Extended European Search Report dated Jul. 18, 2017, issued in counterpart European Application No. 17170382.0. (10 pages).

* cited by examiner

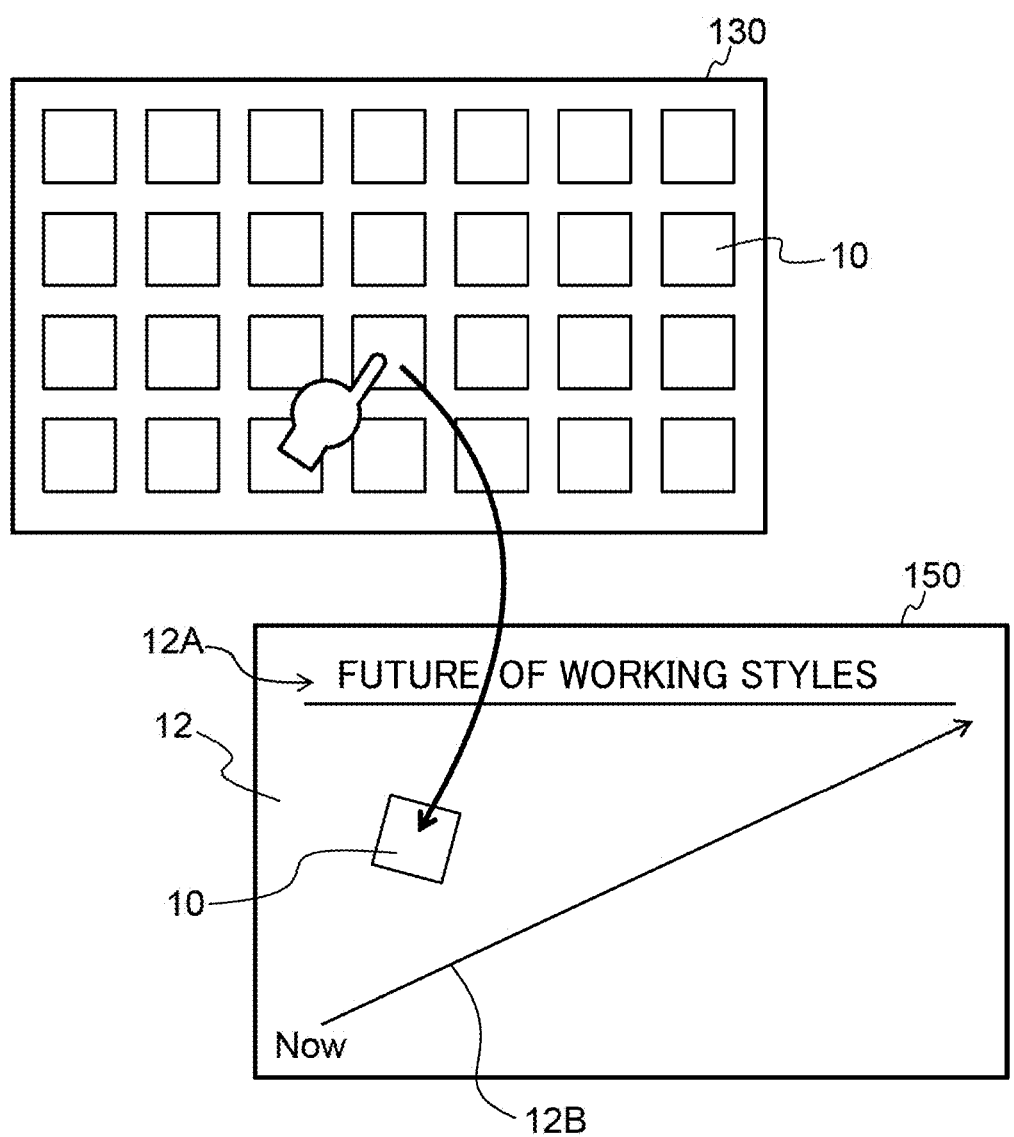

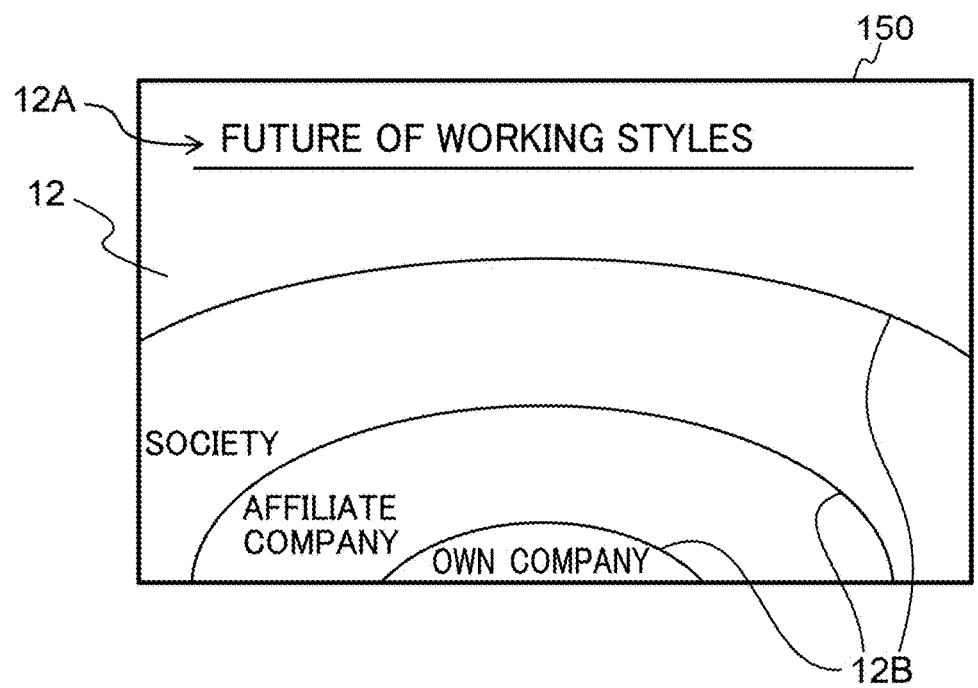
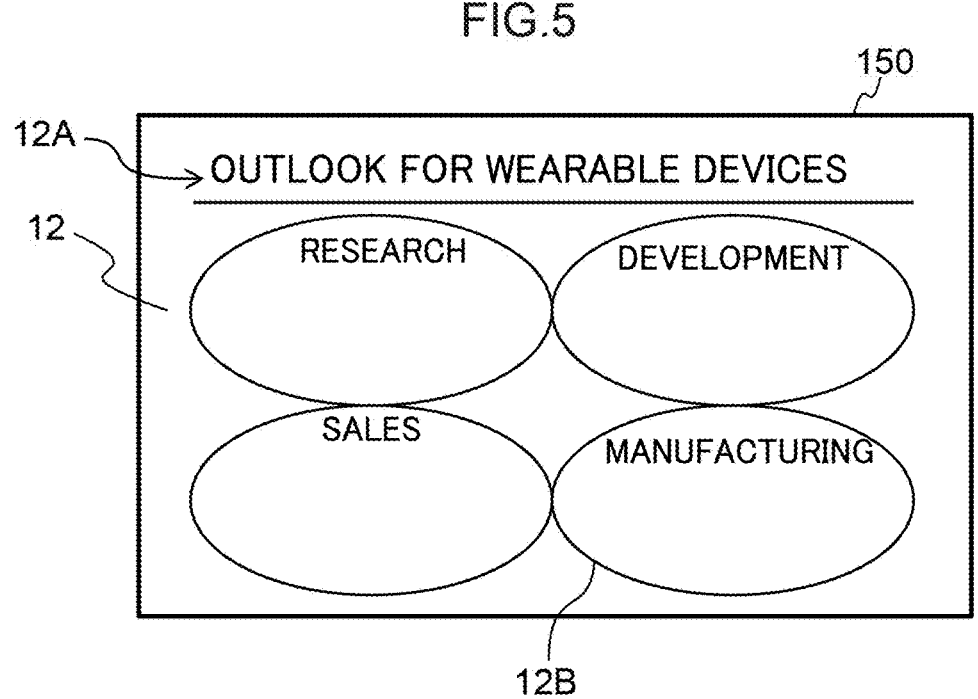

FIG.9

| CARD ID | KEYWORD | IMAGE DATA | DISPLAY POSITION | ... |
|---|---|---|---|---|
| C0001 | GOING MOBILE | c0001.jpg | (x1,y1) | |
| C0002 | GLOBAL EXPANSION | c0002.jpg | (x2,y2) | |
| ... | | | | |

FIG.10

| CARD ID | CHANGE TIMING | ... |
|---|---|---|
| C0001 | 10 SECONDS | |
| C0006 | 20 SECONDS | |
| ... | | |

FIG.11

| BACKGROUND ID | IMAGE DATA | ... |
|---|---|---|
| B0001 | b0001.jpg | |
| B0002 | b0002.jpg | |
| ... | | |

| VISION ID | USER GROUP ID | BACKGROUND ID | CARD ID | DISPLAY POSITION | TITLE | HANDWRITTEN DATA |
|---|---|---|---|---|---|---|
| V0001 | U0001 | B0001 | C0001 | (x1,y1) | FUTURE OF WORKING STYLES | v0001.jpg |
| | | | C0002 | (x2,y2) | | |
| ... | | | ... | | | |

Figure 13:
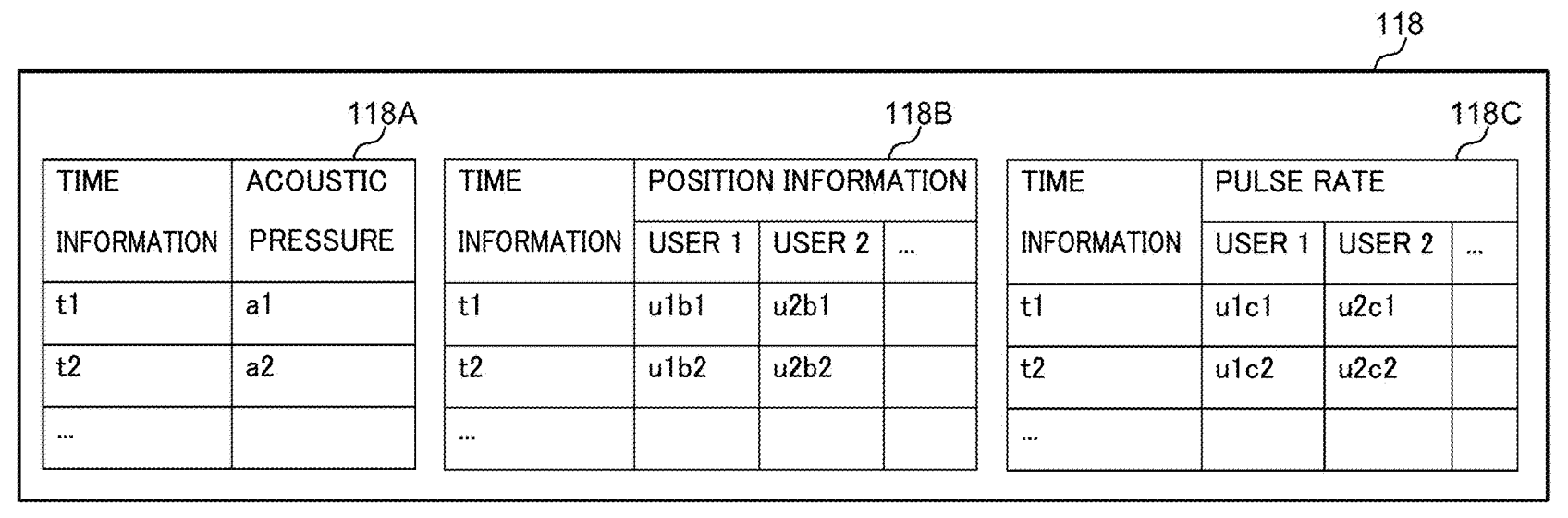

| TIME INFORMATION | ACOUSTIC PRESSURE |
|---|---|
| t1 | a1 |
| t2 | a2 |
| ... | |

118A

| TIME INFORMATION | POSITION INFORMATION | |
| | USER 1 | USER 2 |
|---|---|---|
| t1 | u1b1 | u2b1 |
| t2 | u1b2 | u2b2 |
| ... | | |

118B

| TIME INFORMATION | PULSE RATE | |
| | USER 1 | USER 2 |
|---|---|---|
| t1 | u1c1 | u2c1 |
| t2 | u1c2 | u2c2 |
| ... | | |

118C

118

FIG.14
| CARD ID | TIME INFORMATION | ... |
|---------|------------------|-----|
| C0001   | t12              |     |
| C0006   | t24              |     |
| ...     |                  |     |
119
FIG.15
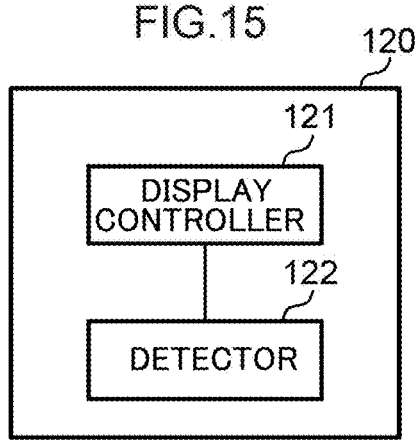
FIG.16
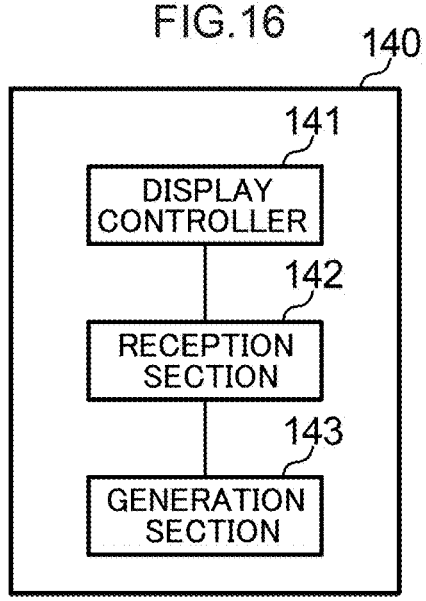

FIG.33

| CARD ID | KEYWORD | IMAGE DATA | INITIAL DISPLAY POSITION | MOVEMENT INFORMATION | ... |
|---|---|---|---|---|---|
| C0001 | GOING MOBILE | c0001.jpg | (x1,y1) | ONE PIXEL IN +x DIRECTION/ CYCLE | |
| C0002 | GLOBAL EXPANSION | c0002.jpg | (x2,y2) | ONE PIXEL IN +x DIRECTION/ CYCLE | |
| ... | | | | | |

FIG.34

| CARD ID | CHANGE TIMING | MOVEMENT INFORMATION | ... |
|---|---|---|---|
| C0001 | 10 SECONDS | ONE PIXEL IN −x DIRECTION/ CYCLE | |
| C0006 | 20 SECONDS | ONE PIXEL IN −x DIRECTION/ CYCLE | |
| ... | | | |

IMAGE CONTROL METHOD AND DEVICE

CROSS-REFERENCE TO RELATED APPLICATION

This application is based upon and claims the benefit of priority of the prior Japanese Patent Application No. 2016-095505, filed on May 11, 2016, the entire contents of which are incorporated herein by reference.

FIELD

The embodiments discussed herein are related to an image control method, an image control device, and a storage medium storing an image control program.

BACKGROUND

Generally, in planning and development of products and services, the rapidity and accuracy with which user desires are extracted from unprocessed comments made by the users is important. Against this backdrop, nowadays, through surveys, interviews, and the like, various investigations into user desires are performed proactively to extract user desires with regards to products and services and bring products or services that satisfy users swiftly to market. Technology has therefore been proposed for assisting extraction of user desires.

For example, technology has been proposed that analyzes input desire information, and, based on the analyzed desire information, weights evaluation indices that are pre-stored in a storage device and that are criteria for quantitatively measuring, with respect to a target product, a user's sense of potential benefit fruition that is contained within the desire information. In this technology, one or plural evaluation indices having the highest weighting are selected from plural weighted evaluation indices, and one or plural product design concepts are chosen to maximize or minimize the selected evaluation indices.

Technology has also been proposed in which documents and scene information, which is appended information related to products or services to which the documents pertain, are input, and analysis is performed based on morphological analysis of the input documents. In such technology, documents are converted into demand expressions indicating product or service states that users demand of products or services, according to specific conversion rules based on the scene information, and the documents and the demand expressions are associated with each other and displayed.

RELATED PATENT DOCUMENTS

Japanese Laid-Open Patent Publication No. 2002-108946
Japanese Laid-Open Patent Publication No. 2001-060194

SUMMARY

According to an aspect of the embodiments, an image control method includes referencing a first storage section at which selection option information, for which a selection operation has been received on a display device displaying plural items of the selection option information, is stored in association with a timing at which the selection operation for the selection option information is received, and a second storage section at which detection information, which is detected by a detection device that detects at least one of a state of a area at which the display device is disposed or a state of a user present in the area at which the display device is disposed, is stored in association with time information indicating a time at which the detection information is detected. The image control method further includes, by a processor, identifying an item of the selection option information stored in the first storage section in association with a timing that corresponds to the time information stored in the second storage section in association with detection information indicating that at least one of the area or the user is in a predetermined state, and effecting control so as to display the identified item of the selection option information on the display device using a different display mode from that of other displayed items of the selection option information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram for explaining a selection option card and a vision;

FIG. 4 is a diagram illustrating another example of a background axis;

FIG. 5 is a diagram illustrating another example of a background axis;

FIG. 9 is a diagram illustrating an example of a card database (DB);

FIG. 10 is a diagram illustrating an example of a change-card DB;

FIG. 11 is a diagram illustrating an example of a background DB;

FIG. 12 is a diagram illustrating an example of a vision DB;

FIG. 13 is a diagram illustrating an example of a detection information DB;

FIG. 14 is a diagram illustrating an example of a selection information DB;

FIG. 15 is a functional block diagram illustrating a schematic configuration of a first control device;

FIG. 16 is a functional block diagram illustrating a schematic configuration of a second control device;

FIG. 33 is a diagram illustrating another example of a card DB; and

FIG. 34 is a diagram illustrating another example of a change-card DB.

DESCRIPTION OF EMBODIMENTS

Detailed explanation follows regarding an example of an exemplary embodiment according to technology disclosed herein, with reference to the drawings. In the exemplary embodiments below, explanation is given regarding examples of cases in which desires of a user group that holds discussions in workshops or the like, with the aim of addressing problems inside and outside a company, are extracted using information and communication technology (ICT).

Figure 1:
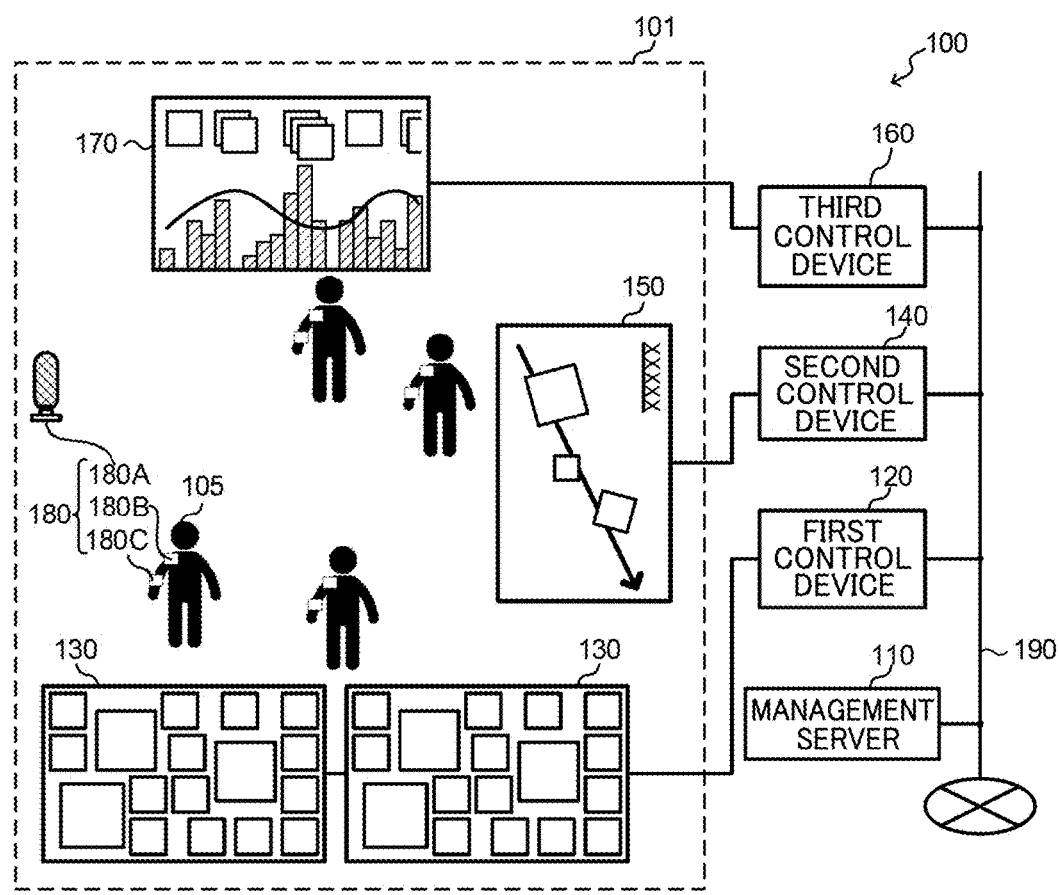
FIG. 1 is a block diagram illustrating a schematic configuration of an image control system according to an exemplary embodiment.

As illustrated in FIG. 1, an image control system 100 according to the present exemplary embodiment includes a management server 110, a first control device 120, first display devices 130, a second control device 140, a second display device 150, a third control device 160, and a third display device 170. As illustrated in FIG. 1, at least the first display devices 130, the second display device 150, and the third display device 170 are installed in a room 101 where a workshop that makes use of services provided by the image control system 100 is held. Sensing devices 180 are also installed in the room 101, and each user 105 participating in the workshop is also fitted with sensing devices 180.

The management server 110, the first control device 120, the second control device 140, and the third control device 160 are connected to one another by a hub 190. The connections between each device and the hub may be wired or may be wireless. The first control device 120 and the first display devices 130, the second control device 140 and the second display device 150, and the third control device 160 and the third display device 170 are respectively connected together, either through a wire or wirelessly.

The management server 110 is an information processing device such as a general server device or a personal computer. The management server 110 manages various information employed by the image control system 100, and respectively instructs the first control device 120, the second control device 140, and the third control device 160 to execute various processing.

Each first display device 130 includes a display section that displays plural selection option cards (described in detail below) and an operation section that receives operations by the user 105 with respect to the displayed selection option cards. The first display device 130 may, for example, be implemented by a touch panel display.

The first control device 120 controls display on the first display device 130, processes information received via the first display device 130, and controls communication with the management server 110.

The second display device 150 includes a display section that displays a vision (described in detail below) representing desires of users 105 using selection option cards, and an operation section that receives operations by users 105 with respect to the displayed selection option cards. The second display device 150 may, for example, be implemented by a touch panel display.

The second control device 140 controls display on the second display device 150, processes information received via the second display device 150, and controls communication with the management server 110.

The third display device 170 includes a display section that displays a live map (described in detail later) graphically representing detection information detected by the sensing devices 180. The third display device 170 may, for example, be implemented by a liquid crystal display.

The third control device 160 controls display on the third display device 170 and controls communication with the management server 110.

The sensing devices 180 form a sensor cluster to detect detection information indicating a state of at least one out of the room 101 in which the workshop is being held, or of the users 105 participating in the workshop. The state of at least one out of the room 101 or the users 105 may be, for example, acoustic pressure, air pressure, temperature, or humidity of the room 101; or pulse rate, body temperature, movement, position, posture, contents of speech or the like of the users 105. It is sufficient that the sensing devices 180 are capable of detecting values indicating such states, and the sensing devices 180 may be implemented by microphones, air pressure sensors, temperature and humidity sensors, vital sign sensors, acceleration sensors, position sensors, or the like.

In the present exemplary embodiment, as an example, explanation is given regarding an example in which microphones 180A that detect acoustic pressure of the room 101, position sensors 180B that detect the positions of the users 105, and vital sign sensors 180C that detect the pulse rate of the users 105 are employed as the sensing devices 180. The position sensors 180B, for example, use the radio wave intensity communicated between badge-type tags that can be worn by the users 105 and a beacon installed at a fixed position in the room 101 to measure the positions of the users 105 wearing the tags. Note that the position sensors 180B may also measure the positions of the users 105 using a Global Positioning System (GPS) or Near Field Communication (NFC). The positions of the users 105 may also be measured by analyzing images captured in the room 101. The vital sign sensors 180C may, for example, employ wristband-type sensors in which a pulse sensor is fitted tightly against the wrist of the user 105.

Note that as described above, individual sensors that detect a single type of detection information may be employed as the sensing devices 180, wearable devices mounted with a combination of various types of sensors, or the like may be employed as the sensing devices 180. For example, a sensing device 180 in which an acceleration sensor is mounted to the position sensors 180B described above, and that is capable of detecting both the position of the user 105 and posture of the user 105, may be employed. Moreover, the vital sign sensor 180C described above may be mounted with an air pressure sensor and a temperature and humidity sensor so as to detect the air pressure, temperature, and humidity of the room 101, as well as the pulse rate of the user 105.

Note that the sensing devices 180 are an example of a detection device of technology disclosed herein.

Explanation follows regarding selection option cards, visions, and live maps.

Figure 2:
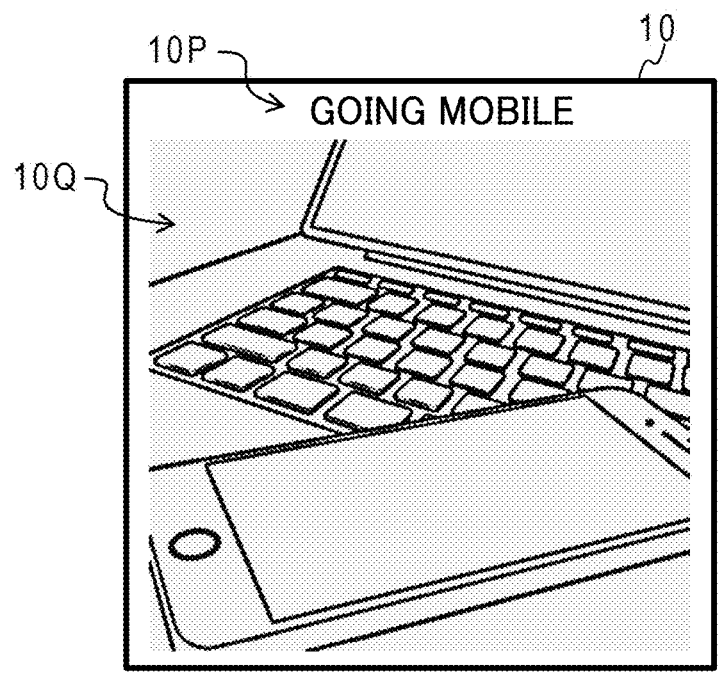
FIG. 2 is a diagram illustrating an example of a selection option card.

Selection option cards are cards in which various selection options for extracting desires of the users 105 are each electronically represented by a single card using a keyword and an image, such as a photograph or an illustration. FIG. 2 illustrates an example of a selection option card 10. In the example of FIG. 2, the selection option card 10 includes a keyword 10P and an illustration 10Q indicating the selection option represented by that selection option card 10. Various content can be applied to the selection options represented by the selection option cards 10, and examples include content related to facilities, content related to work methods, content in which ICT may be employable, and content unrelated to ICT. Moreover, the selection option card 10 may include the keyword 10P alone or the illustration 10Q alone.

The selection option cards 10 prepared corresponding to the number of selection options, and, as illustrated in the upper part of FIG. 3, the plural selection option cards 10 are displayed on the first display device 130 in a state enabling operations, including selection operations, to be received from the user 105. The selection option cards 10 that are display may be all of the selection option cards, or may be some out of the selection option cards. The user 105 views the plural selection option cards 10 displayed on the first display device 130, and selects a selection option card 10 relating to their desire.

Note that the selection option cards 10 are an example of selection option information of technology disclosed herein.

A vision is a type of graphic modeling desires of the users 105 using the selection option cards 10, and includes a background 12 selected according to a desire of a user 105. The background 12 includes a region 12A for inputting a title, and an axis 12B representing the passage of time or the like. In the example in the lower part of FIG. 3, a time axis spanning from the present into the future is employed as an example of the axis 12B. There is no limitation the axis 12B representing a long-term time axis as illustrated in the example in the lower part of FIG. 3, and the axis 12B may represent a single day as "morning", "noon", and "night" on a time axis. Moreover, the axis 12B is not limited to representing the passage of time, and axes 12B may, for example, be used to represent different roles such as "own company", "affiliate company", and "society", as illustrated in FIG. 4. Moreover, as illustrated in FIG. 5, the axes 12B may represent different divisions, such as "research", "development", "manufacturing", and "sales". Other examples that axes 12B may be used to represent include different places such as "in-office", "another office", and "outside the company".

As illustrated in the lower part of FIG. 3, selection option cards 10 selected on the first display device 130 are displayed over the background 12 displayed on the second display device 150. A user 105 considers the axis 12B and places the displayed selection option cards 10 at appropriate positions. A vision representing desires of the user 105 is thus drawn up by placing the selection option cards 10 on the background 12 that includes the axis 12B. The vision may also be drawn using hand-drawing tools.

Figure 6:
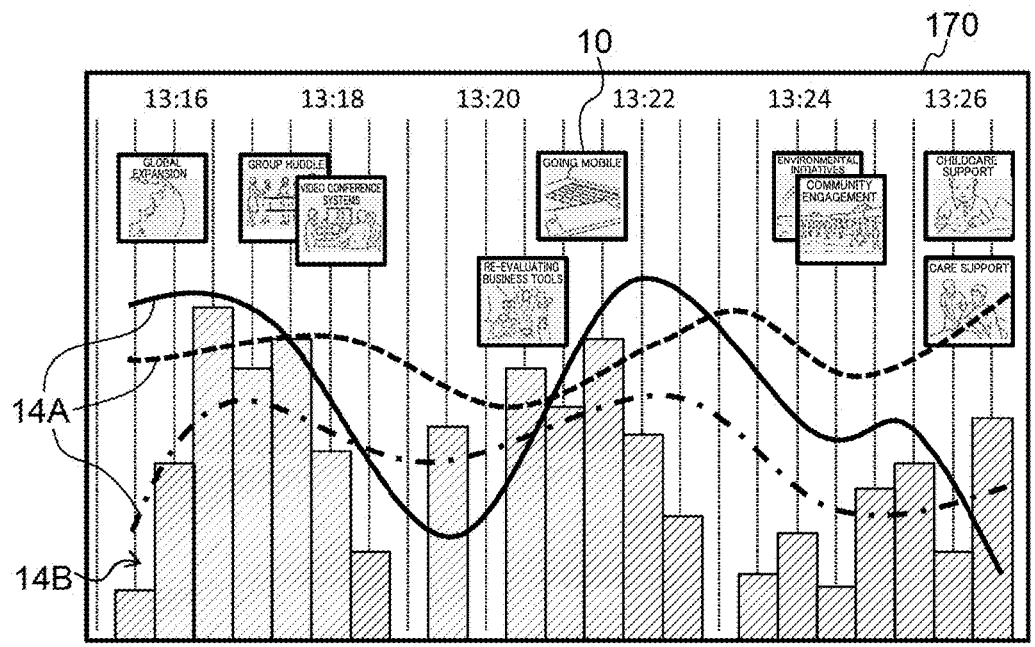
FIG. 6 is a diagram illustrating an example of a live map.

A live map is a graphic representation of detection information detected by the sensing devices 180. FIG. 6 illustrates an example of a live map. In the example of FIG. 6, changes over time in the detection information detected by the sensing devices 180 are expressed as a graph, with time along the horizontal axis. More specifically, in the example of FIG. 6, the pulse rate of each user 105 is represented by the dashed-line graph 14A, and the acoustic pressure in the room 101 is displayed by the histogram 14B. Note that the dashed line graph representing pulse rate is expressed as a curve that has been smoothed. The histogram representing acoustic pressure may show average or cumulative values, or the like for the acoustic pressure in specific time units. Moreover, as illustrated in FIG. 6, the live map may also display the selection option cards 10 selected on the first display device 130 at positions on the graphs corresponding to the time when the selection option card 10 was selected.

Figure 7:
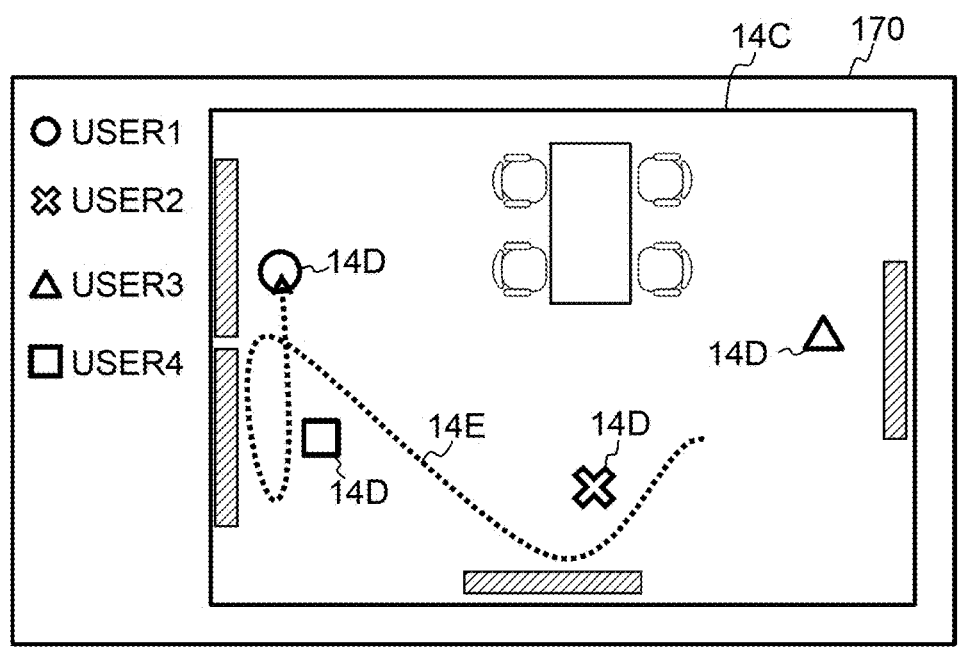
FIG. 7 is a diagram illustrating another example of a live map.

FIG. 7 illustrates another example of a live map. In the example of FIG. 7, the third display device 170 displays a layout diagram 14C of the room 101 on the third display device 170; the current position of each user 105 is displayed on the layout diagram 14C using different symbols 14D (a circle, cross, triangle, and square in the example of FIG. 7) for each user 105. Moreover, as illustrated in FIG. 7, movement tracking 14E (the dotted arrow in the example of FIG. 7) of the users 105 may also be displayed.

Detailed explanation follows regarding each device of the image control system 100.

Figure 8:
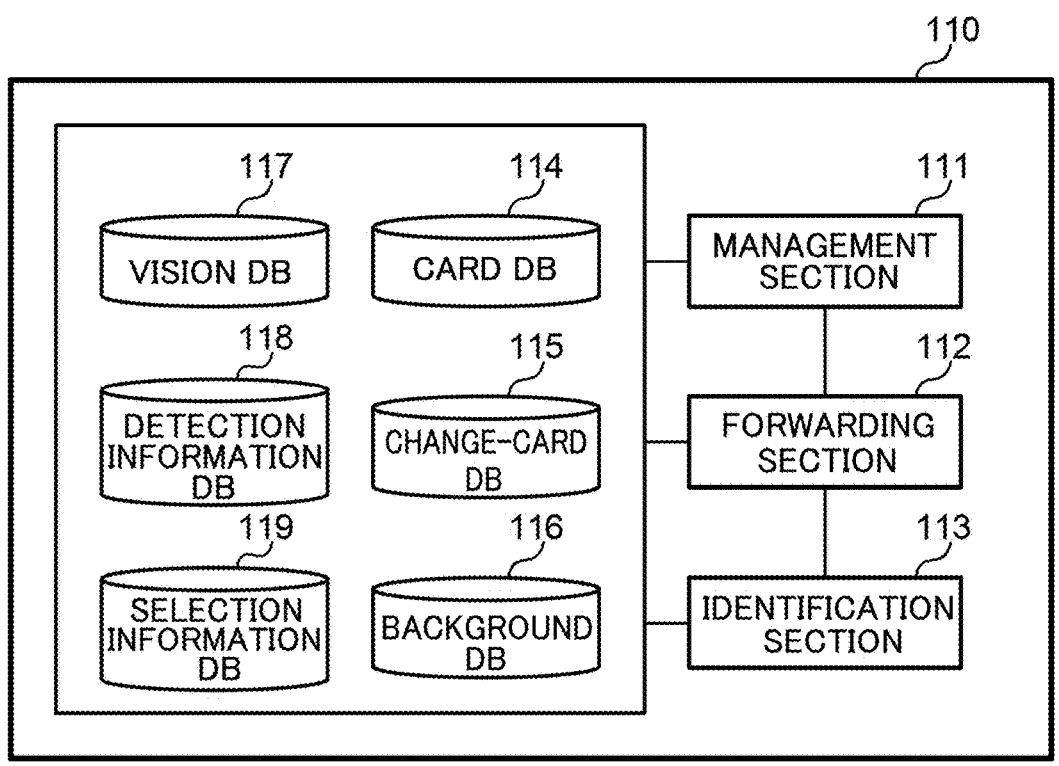
FIG. 8 is a functional block diagram illustrating a schematic configuration of a management server.

First, explanation follows regarding the management server 110. As illustrated in FIG. 8, the management server 110 includes a management section 111, a forwarding section 112, and an identification section 113 as functional sections. A card database (DB) 114, a change-card DB 115, a background DB 116, a vision DB 117, a detection information DB 118, and a selection information DB 119 are stored in specific storage regions of the management server 110.

Explanation follows regarding the various databases stored in the specific storage region of the management server 110.

The card DB 114 is stored with card information for each of the selection option cards 10. FIG. 9 illustrates an example of the card DB 114. In the example of FIG. 9, each row corresponds to card information for a single selection option card 10. Each item of card information includes information such as a "card ID" that is identification information of the selection option card 10, a "keyword" displayed on the selection option card 10, and "image data" such as a photograph or illustration displayed on the selection option card 10. The respective card information also includes information of a "display position" for when the selection option card 10 is displayed on the first display device 130. For example, an xy-coordinate system is set with the origin at the upper left corner of a display region of the first display device 130; with the direction toward the right as the positive x-axis direction, and the downward direction as the positive y-axis direction. Which point in the display region to use as the origin may be decided by the system designer, and, for example, the center of the display region may be set as the origin. Moreover, a display position of a specific location of the selection option card 10 (for example, the upper left corner) may be expressed using coordinate values in the xy-coordinate system set for the display region of the first display device 130. Which point within the selection option card 10 to use as the origin may be decided by the system designer, and, for example, the center of the selection option card 10 may be used as the origin.

The change-card DB 115 is stored with change-card information identifying selection option cards 10 to be displayed using a different display mode from that of the other selection option cards 10 when displayed on the first display device 130 (such selection option cards 10 are referred to below as "change-cards"). FIG. 10 illustrates an example of the change-card DB 115. In the example in FIG. 10, each row corresponds to change-card information for a single change-card. Each item of change-card information includes information such as the "card ID" of the change-card, and a "change timing" for changing the change-card to a different display mode from that of the other selection option cards 10. Note that in the example of FIG. 10, the "change timing" is a duration that elapses starting from the start of display of the selection option card 10 on the first display device 130.

The background DB 116 is stored with information regarding respective backgrounds 12 for display on the second display device 150. FIG. 11 illustrates an example of the background DB 116. In the example of FIG. 11, each row corresponds to background information for a single background 12. Each item of background information includes information such as a "background ID" serving as identification information of the background 12, and "image data" of the background 12 that includes the axis 12B.

The vision DB 117 is stored with vision information generated by the users 105 on the second display device 150. FIG. 12 illustrates an example of the vision DB 117. In the example of FIG. 12, each row corresponds to vision information representing a single vision. Each item of vision information includes information such as a "vision ID" serving as identification information of the vision, a "user group ID" serving as identification information of the user group that generated the vision, and "background ID" of the background 12 to display on the second display device 150. Moreover, the vision information includes information such as the "card IDs" of the selection option cards 10 that were selected, and the "display positions" indicating the positions at which the respective selection option cards 10 displayed on the background 12. The "display position" can be represented using a coordinate value on an xy-coordinate system set for the background 12 region displayed on the second display device 150, similarly to the display position of the selection option card 10 displayed on the first display device 130 described above. The vision information further includes information such as a "title", input as text data, and "handwritten data" representing an image that was drawn using a handwriting tool. Note that the title may also be input as handwritten data.

When a single user group has generated plural types of vision, plural items of vision information, respectively associated with plural different vision IDs, are stored associated with the user group ID of that user group. Note that different visions refer to cases in which any out of the background 12, the selected selection option cards 10, the placement of the selection option cards 10 on the background 12, hand-drawn drawings, or the like, differ from each other.

The vision DB 117 may be stored with data items other than those illustrated in FIG. 12 associated with the vision IDs. For example, information indicating the date and time at which the vision was stored may be stored.

The detection information DB 118 is stored, in chronological order, with the detection information detected by the respective sensing devices 180 in each sampling period. The detection information DB 118 is an example of a second storage section. FIG. 13 illustrates an example of the detection information DB 118. In the example of FIG. 13, the detection information DB 118 includes an acoustic pressure table 118A, a position information table 118B, and a pulse rate table 118C. The acoustic pressure table 118A is a table stored with acoustic pressure detected by the microphones 180A. The position information table 118B is a table stored with the position information of each user 105 detected by the respective position sensors 180B fitted to each of the users 105. The pulse rate table 118C is a table stored with the pulse rates of each user 105 detected by the vital sign sensors 180C fitted to each of the users 105.

The selection information DB 119 is stored with selection information relating to selection option cards 10 that have been selected on the first display device 130. The selection information DB 119 is an example of a first storage section. FIG. 14 illustrates an example of the selection information DB 119. In the example of FIG. 14, each row corresponds to selection information for a single selected selection option card 10. Each item of selection information includes information such as the "card ID" of the selected selection option card 10, and "time information" indicating the time at which that selection option card 10 was selected on the first display device 130.

Next, explanation follows regarding each functional section of the management server 110.

When instructed to start the service provided by the image control system 100, the management section 111 acquires the card information of each of the selection option cards 10 from the card DB 114, and acquires change-card information from the change-card DB 115. The management section 111 transmits the acquired card information and change-card information to the first control device 120.

The management section 111 also acquires one item of background information from the background DB 116 and transmits the background information to the second control device 140. The background information transmitted to the second control device 140 may be predetermined background information, may be randomly selected background information, or may be background information selected by a user 105.

When the management section 111 has received the vision information transmitted from the second control device 140, the management section 111 appends a vision ID to the received vision information, and stores the received vision information in the vision DB 117.

When the forwarding section 112 receives, from the first control device 120, selection information relating to a selection option card 10 selected from the selection option cards 10 displayed on the first display device 130, the forwarding section 112 stores the received selection information in the selection information DB 119. The forwarding section 112 also forwards the card information of the selection option card 10 indicated by the received selection information to the second control device 140. The forwarding section 112 also forwards received selection information and card information of the selection option card 10 indicated by the received selection information to the third control device 160.

The identification section 113 acquires the detection information detected by the respective sensing devices 180, stores the detection information in the detection information DB 118, and transmits the detection information to the third control device 160.

From the detection information stored in the detection information DB 118, the identification section 113 also extracts time information from detection information that indicates a specific state. The specific state may, for example, be a state indicating heightened excitement in the workshop, such as a lively exchange of speech, for example. When the identification section 113 extracts the time information of the detection information indicating the specific state, the identification section 113 references the selection information DB 119 and identifies the selection option card 10 that was selected at a timing corresponding to the extracted time information.

For example, from the acoustic pressure table 118A, the identification section 113 extracts time information for a timeframe in which acoustic pressure of a predetermined threshold value or greater was detected. Moreover, for example, the identification section 113 extracts, from the position information table 118B, time information corresponding to position information of each of the users 105 that satisfies specific conditions. Examples of the specific conditions include cases in which a movement amount or movement speed of the respective users 105 in a specific timeframe is a specific value or greater, cases in which clustering or dispersion of the users 105 has a specific value or greater, or the like.

Moreover, for example, from the pulse rate table 118C, the identification section 113 extracts time information of a timeframe in which a detected pulse rate was a predetermined threshold value or greater. The pulse rate that is compared against the threshold value may be the pulse rate of any user 105, the pulse rates of all of the users 105, or an average or sum total pulse rate of the respective users 105.

From the selection information DB 119, the identification section 113 identifies the card ID associated with the time information (selection timing) included in the specific timeframe corresponding to the extracted time information. The specific timeframe corresponding to the extracted time information may, for example, be a specific timeframe leading up to or continuing after the extracted time information, or a specific timeframe including the extracted time information and also including timeframes before and after the extracted time information. The specific timeframe may also be a specific timeframe that does not include the extracted time information and that is earlier than the extracted time information, may be a specific timeframe that does not include the extracted time information and that is later than the extracted time information, or the like.

The identification section 113 associates specific change timings with the identified card IDs, and stores these in the change-card DB 115. As the specific change timings, for example, change timings at specific time intervals (for example 10 second intervals) may be associated in the sequence in which the selection option cards 10 indicated by the identified card IDs were selected on the first display device 130. For example, suppose that card IDs C0001 and C0006 were identified, and the time information at which the selection option card 10 with the card ID C0001 was selected is t12, and the time information at which the selection option card 10 with the card ID C0006 was selected is t24 (t12<t24). In this case, if the change timings are associated at 10 second intervals, a change timing of "10 seconds" is associated with card ID=C0001, and a change timing of "20 seconds" is associated with card ID=C0006.

Next, explanation follows regarding the first control device 120. As illustrated in FIG. 15, the first control device 120 includes a display controller 121 and a detector 122 as functional sections.

The display controller 121 receives the card information and change-card information transmitted from the management server 110, and controls such that each selection option card 10 indicated by the card information is displayed on the first display device 130. The display size of the respective selection option cards 10 may be a predetermined size, or may be a size calculated such that a specific number of selection option cards 10 are displayed on the first display device 130.

The display controller 121 changes the display mode of the change-cards to a different display mode from that of the other selection option cards 10 at a timing indicated by the change timing included in the change-card information for each of the change-cards indicated by the change-card information. Specifically, the display controller 121 changes the display mode of the change-cards such that the visibility of a change-card is greater than that of the other selection option cards 10. For example, as changes to the display mode, the display controller 121 may perform display control including any, or a combination of: enlarging the display size; increasing the brightness or saturation; flashing; or applying a color to a border of the card. In the present exemplary embodiment, explanation is given regarding a case in which the display size of the change-card is made larger than that of the other selection option cards 10.

Specifically, the display controller 121 enlarges the display size of a change-card that has arrived at its change timing by a specific factor (for example a factor of four). Accompanying enlargement of the display of the change-card, the display controller 121 also moves the display positions of the surrounding selection option cards 10 to positions avoiding the change-card after display enlargement. Known image placement optimization technology or the like may be used to determine the positions of the surrounding selection option cards 10 after they have been moved. Note that there is no limitation to moving the surrounding selection option cards 10 to positions that avoid the change-card, and the change-card may be displayed on top so as to overlap the surrounding selection option cards 10 after enlarging the display. When the change timing for a different change-card to the change-card currently enlarged arrives, the display controller 121 returns the change-card that is currently enlarged to its original display size, and returns the display positions of the surrounding selection option cards 10 to their original positions.

Note that when enlarging the display of a change-card, the display controller 121 may enlarge in increments of a predetermined number of pixels at the top, bottom, left, and right, or may increase the current display size in increments of a specific factor (for example, by a factor of 1.1), until the display size reaches the specific factor. Namely, an animated display may be used to display the display enlargement from the current display size to the display size at the specific factor. In such cases, since movement occurs on the screen when enlarging display of the change-card, it is easy to attract the attention of the users 105 to the change-card and the surrounding selection option cards 10, and the way in which the display mode has changed becomes easier to comprehend.

The detector 122 detects a selection operation by a user 105 with respect to the selection option cards 10 displayed on the first display device 130. Specifically, the detector 122 detects whether or not a specific duration (for example 3 seconds) during which a user 105 continuously touches a selection option card 10 has elapsed. When the detector 122 has detected that continuous touching for the specific duration has elapsed, the detector 122 transmits selection information that the card ID of the touched selection option card 10 is associated with the time information indicating the timing at which the selection option card 10 was selected, to the management server 110. The timing at which the selection option card 10 was selected may, for example, be a timing at which the touch continuation duration exceeded the specific duration. Note that the manner in which a selection operation of a selection option card 10 is detected need not be limited to the above example. For example, configuration may be made such that a function menu screen is displayed when a touch operation of a selection option card 10 has been received, and an operation instruction on the displayed function menu screen is received in order to select the card.

Next, explanation follows regarding the second control device 140. As illustrated in FIG. 16, the second control device 140 includes a display controller 141, a reception section 142, and a generation section 143 as functional sections.

When the display controller 141 has received background information transmitted from the management server 110, the display controller 141 displays the background 12 indicated by the received background information on the second display device 150. Moreover, when the display controller 141 has received card information from the management server 110, the display controller 141 displays the selection option cards 10 indicated by the received card information on the background 12. The positions at which the selection option cards 10 are displayed may be chosen at random, or the selection option cards 10 may be displayed at predetermined positions.

Moreover, when the display controller 141 has been notified of received information (described in detail below) from the reception section 142, the display controller 141 modifies the display positions and display sizes of the selection option cards 10, displays input text data, displays drawn images, and the like based on the received information.

The reception section 142 receives user 105 operations such as modifications to the display positions and modifications to the display sizes of the selection option cards 10 displayed on the second display device 150, input of text data, and drawings made using the handwriting tool. The reception section 142 notifies the received information indicating contents of the received user 105 operations to the display controller 141.

When the generation section 143 has been instructed to finalize a vision by the users 105, the generation section 143 acquires the display position of each of the selection option cards 10 on the background 12 displayed on the second display device 150. The generation section 143 then generates vision information including the background ID of the background 12 displayed on the second display device 150, the card IDs of the selection option cards 10, the acquired display positions of the selection option cards 10, the input text data, and the drawn handwritten data. The generation section 143 acquires the user group ID of the user group that created the vision from login information, registration information employed when the system was used, or the like; appends the user group ID to the generated vision information; and transmits the vision information to the management server 110.

Figure 17:
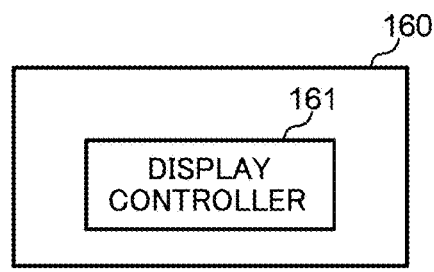
FIG. 17 is a functional block diagram illustrating a schematic configuration of a third control device.

Next, explanation follows regarding the third control device 160. As illustrated in FIG. 17, the third control device 160 includes a display controller 161 as a functional section.

When the display controller 161 receives detection information transmitted from the management server 110, the display controller 161 makes a graphic representation of the received detection information, and displays this as a live map on the third display device 170. Specifically, in cases in which the detection information (acoustic pressure and pulse rates) is displayed in graph form on the live map (see FIG. 6, for example), the display controller 161 displays additional portions representing the newly received detection information on the graphs that are being displayed based on previously received detection information. When performing additional display, the display controller 161 may, for example, use previously received detection information to smooth the received detection information. Each time new detection information is received, a portion representing that detection information is added to the graphs, enabling changes over time in the detection information to be displayed in real time.

In cases in which position information of the users 105 is displayed on a live map (see FIG. 7, for example), the display controller 161 calculates coordinate values on the layout diagram 14C corresponding to the position information received as the detection information. The display controller 161 displays the symbols 14D allocated to the respective users 105 at the calculated coordinate values. Displaying a live map based on constantly changing position information enables the movement of the users 105 to be displayed in real time. Moreover, movement tracking of the user 105 may be acquired by retracing past position information in chronological order.

The display controller 161 also receives selection information (card ID and time information) transmitted from the management server 110, and the card information of the selection option card 10 corresponding to the card ID included in the selection information. The display controller 161 associates the selection option card 10 indicated by the received card information with the detection information for when that selection option card 10 was selected, and displays this on the live map.

Specifically, as illustrated in FIG. 6, on the live map showing graphs of the detection information (acoustic pressure and pulse rates), the display controller 161 displays the selection option card 10 indicated by the received card information, at a position on the horizontal axis of the graph that corresponds to the time information included in the selection information.

Note that the display controller 161 may display the live map illustrated in FIG. 6 and the live map illustrated in FIG. 7 on the third display device 170 in a manner enabling switching between the live maps, or may display both of the live maps at the same time, on two screens. Moreover, two of the third display devices 170 may be provided for the live map illustrated in FIG. 6 and the live map illustrated in FIG. 7 respectively.

Figure 18:
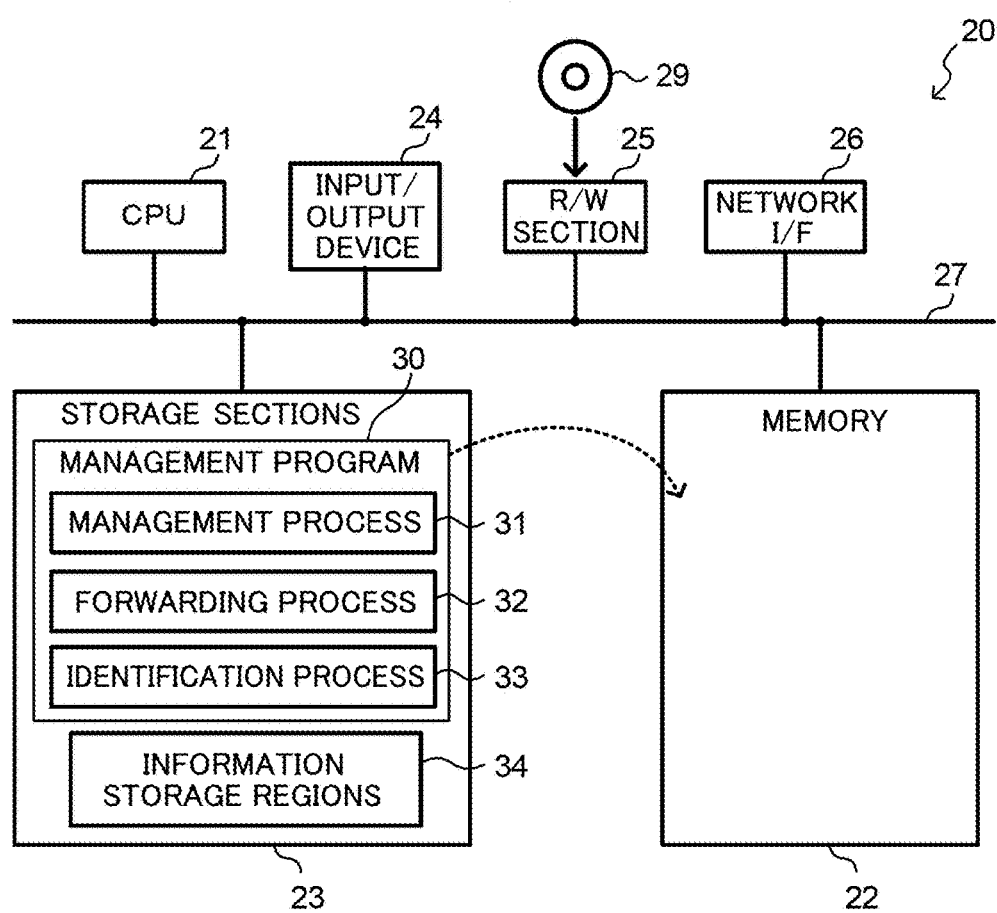
FIG. 18 is a block diagram illustrating a schematic configuration of a computer that functions as the management server.

The management server 110 may, for example, be implemented by the computer 20 illustrated in FIG. 18. The computer 20 includes a Central Processing Unit (CPU) 21, memory 22 serving as a temporary storage region, and a non-volatile storage section 23. The computer 20 includes an input/output device 24, a Read/Write (R/W) section 25 that controls reading data from and writing data to a recording medium 29, and a network interface (I/F) 26 connected to a network such as the Internet. The CPU 21, the memory 22, the storage section 23, the input/output device 24, the R/W section 25, and the network I/F 26 are connected to one another through a bus 27.

The storage section 23 may be implemented by a Hard Disk Drive (HDD), a solid state drive (SSD), flash memory, or the like. A management program 30 that causes the computer 20 to function as the management server 110 is stored in the storage section 23, which serves as a storage medium. The management program 30 includes a management process 31, a forwarding process 32, and an identification process 33. The storage section 23 includes an information storage region 34 storing items of information that respectively configure the card DB 114, the change-card DB 115, the background DB 116, the vision DB 117, the detection information DB 118, and the selection information DB 119.

The CPU 21 reads the management program 30 from the storage section 23, expands the management program 30 into the memory 22, and sequentially executes the processes included in the management program 30. The CPU 21 operates as the management section 111 illustrated in FIG. 8 by executing the management process 31. The CPU 21 also operates as the forwarding section 112 illustrated in FIG. 8 by executing the forwarding process 32. The CPU 21 also operates as the identification section 113 illustrated in FIG. 8 by executing the identification process 33. The CPU 21 respectively reads the items of information from the information storage regions 34, and respectively expands the card DB 114, the change-card DB 115, the background DB 116, the vision DB 117, the detection information DB 118, and the selection information DB 119 into the memory 22. The computer 20, which executes the management program 30, thereby functions as the management server 110.

Figure 19:
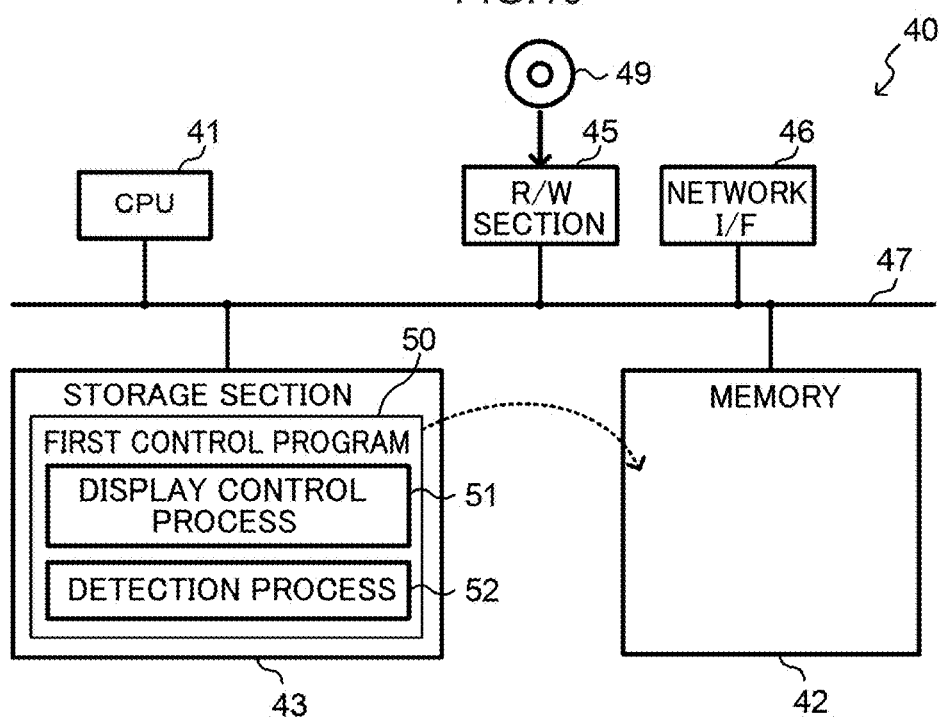
FIG. 19 is a block diagram illustrating a schematic configuration of a computer that functions as the first control device.

The first control device 120 may, for example, be implemented by the computer 40 illustrated in FIG. 19. The computer 40 includes a CPU 41, memory 42 serving as a temporary storage region, and a non-volatile storage section 43. The computer 40 further includes an R/W section 45 that controls reading data from and writing data to a recording medium 49, and a network I/F 46. The CPU 41, the memory 42, the storage section 43, the R/W section 45, and the network I/F 46 are connected to one another through a bus 47. Moreover, the computer 40 is connected to the first display device 130 through the network I/F 46.

The storage section 43 may be implemented by an HDD, an SSD, flash memory, or the like. A first control program 50 for causing the computer 40 to function as the first control device 120 is stored in the storage section 43, which serves as a storage medium. The first control program 50 includes a display control process 51 and a detection process 52.

The CPU 41 reads the first control program 50 from the storage section 43, expands the first control program 50 into the memory 42, and sequentially executes the processes included in the first control program 50. The CPU 41 operates as the display controller 121 illustrated in FIG. 15 by executing the display control process 51. The CPU 41 also operates as the detector 122 illustrated in FIG. 15 by executing the detection process 52. The computer 40, which executes the first control program 50, thereby functions as the first control device 120.

Figure 20:
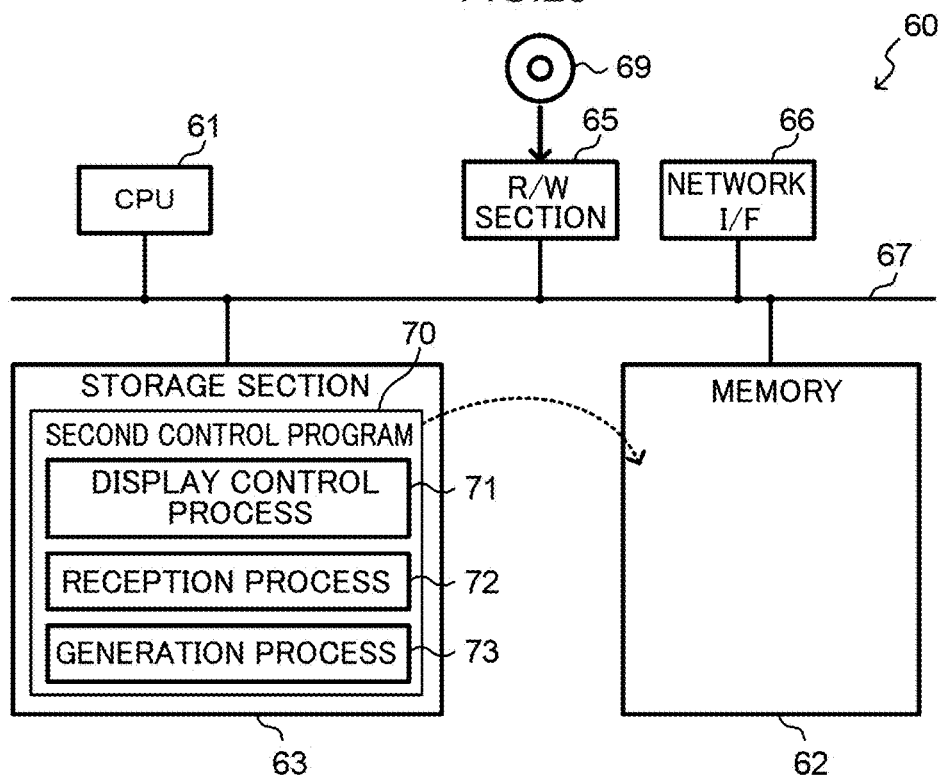
FIG. 20 is a block diagram illustrating a schematic configuration of a computer that functions as the second control device.

The second control device 140 may, for example, be implemented by the computer 60 illustrated in FIG. 20. The computer 60 includes a CPU 61, memory 62 serving as a temporary storage region, and a non-volatile storage section 63. The computer 60 further includes an R/W section 65 that controls reading of data from and writing of data to a recording medium 69, and a network I/F 66. The CPU 61, the memory 62, the storage section 63, the R/W section 65, and the network I/F 66 are connected to one another through a bus 67. Moreover, the computer 60 is connected to the second display device 150 via the network I/F 66.

The storage section 63 may be implemented by an HDD, an SSD, flash memory, or the like. A second control program 70 for causing the computer 60 to function as the second control device 140 is stored in the storage section 63, which serves as a storage medium. The second control program 70 includes a display control process 71, a reception process 72, and a generation process 73.

The CPU 61 reads the second control program 70 from the storage section 63, expands the second control program 70 into the memory 62, and sequentially executes the processes included in the second control program 70. The CPU 61 operates as the display controller 141 illustrated in FIG. 16 by executing the display control process 71. The CPU 61 also operates as the reception section 142 illustrated in FIG. 16 by executing the reception process 72. The CPU 61 also operates as the generation section 143 illustrated in FIG. 16 by executing the generation process 73. The computer 60, which executes the second control program 70, thereby functions as the second control device 140.

Figure 21:
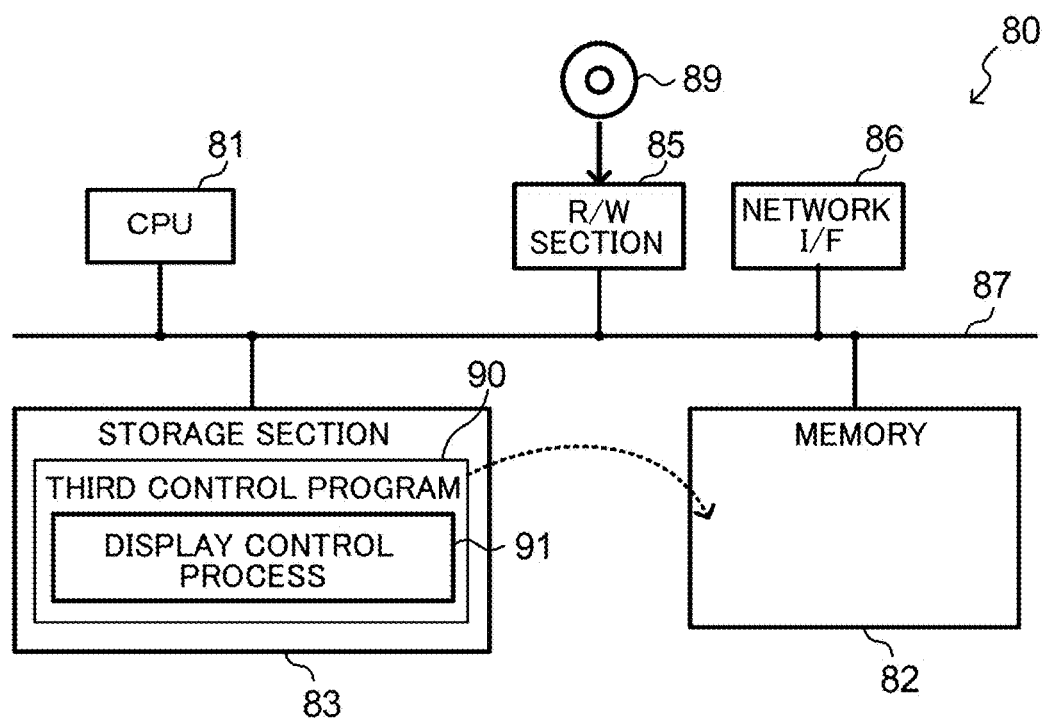
FIG. 21 is a block diagram illustrating a schematic configuration of a computer that functions as the third control device.

The third control device 160 may, for example, be implemented by the computer 80 illustrated in FIG. 21. The computer 80 includes a CPU 81, memory 82 serving as a temporary storage region, and a non-volatile storage section 83. The computer 80 further includes an R/W section 85 that controls reading of data from and writing of data to a recording medium 89, and a network I/F 86. The CPU 81, the memory 82, the storage section 83, the R/W section 85, and the network I/F 86 are connected to one another through a bus 87. Moreover, the computer 80 is connected to the third display device 170 via the network I/F 86.

The storage section 83 may be implemented by an HDD, an SSD, flash memory, or the like. A third control program 90 for causing the computer 80 to function as the third control device 160 is stored in the storage section 83, which serves as a storage medium. The third control program 90 includes a display control process 91.

The CPU 81 reads the third control program 90 from the storage section 83, expands the third control program 90 into the memory 82, and executes the process included in the third control program 90. The CPU 81 operates as the display controller 161 illustrated in FIG. 17 by executing the display control process 91. The computer 80, which executes the third control program 90, thereby functions as the third control device 160.

Note that the functionality respectively implemented by the management program 30, the first control program 50, the second control program 70, and the third control program 90 may, for example, be implemented by semiconductor integrated circuits, and more specifically, by Application Specific Integrated Circuits (ASIC) or the like.

Next, explanation follows regarding operation of the image control system 100 according to the present exemplary embodiment. When an instruction to start the service provided by the image control system 100 is received, the management server 110 executes the first management processing illustrated in FIG. 22. The management server 110 also executes the second management processing illustrated in FIG. 23 and the third management processing illustrated in FIG. 24. Moreover, the first control device 120 executes the first control processing illustrated in FIG. 25. The second control device 140 also executes the second control processing illustrated in FIG. 28. The third control device 160 also executes the third control processing illustrated in FIG. 29. Detailed explanation follows regarding the respective processes. Note that the first management processing, the second management processing, the third management processing, the first control processing, the second control processing, and the third control processing are examples of an image control method of technology disclosed herein.

Figure 22:
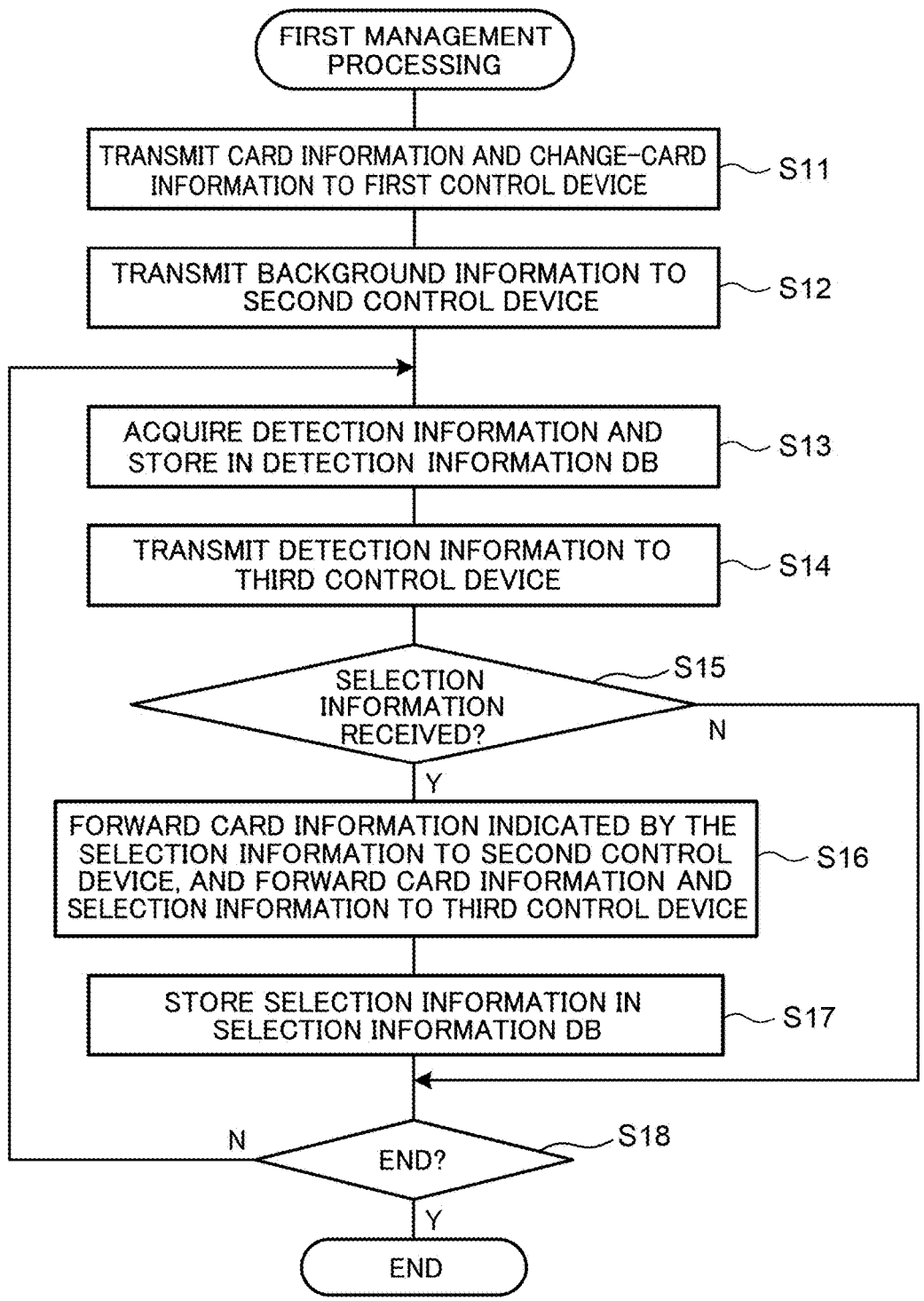
FIG. 22 is a flowchart illustrating an example of first management processing.

First, explanation follows regarding the first management processing illustrated in FIG. 22. At step S11, the management section 111 acquires card information of each of the selection option cards 10 from the card DB 114 and acquires change-card information from the change-card DB 115. The management section 111 then transmits the acquired card information and change-card information to the first control device 120.

Next, at step S12, the management section 111 acquires an item of background information from the background DB 116, and transmits the acquired background information to the second control device 140.

Next, at step S13, the identification section 113 acquires the detection information detected by the respective sensing devices 180, and stores the acquired detection information in the detection information DB 118. Next, at step S14, the identification section 113 transmits the acquired detection information to the third control device 160.

Next, at step S15, the forwarding section 112 determines whether or not selection information relating to a selection option card 10 selected from out of the selection option cards 10 displayed on the first display device 130 has been received from the first control device 120. In cases in which selection information has been received, processing transitions to step S16, and in cases in which selection information has not been received, processing transitions to step S18.

At step S16, the forwarding section 112 forwards the card information of the selection option card 10 indicated by the selection information received at step S15 above to the second control device 140. The forwarding section 112 also forwards the received selection information and the card information of the selection option card 10 indicated by the received selection information to the third control device 160. Next, at step S17, the forwarding section 112 stores the selection information received at step S15 above in the selection information DB 119.

Next, at step S18, the management section 111 determines whether or not an instruction to end the service provided by the image control system 100 has been given; processing returns to step S13 in cases in which an instruction to end the service has not been given, and the first management processing ends in cases in which an instruction to end the service has been given.

Figure 23:
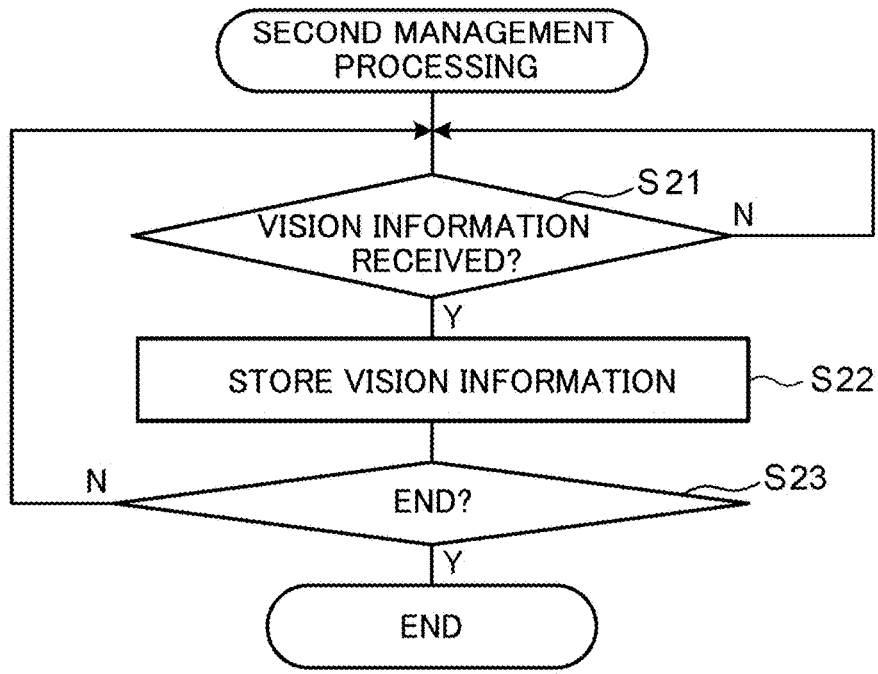
FIG. 23 is a flowchart illustrating an example of second management processing.

Next, explanation follows regarding the second management processing illustrated in FIG. 23. At step S21, the management section 111 determines whether or not vision information transmitted from the second control device 140 has been received. The determination of the current step is repeated in cases in which vision information has not been received. In cases in which vision information has been received, processing transitions to step S22, and the management section 111 appends a vision ID to the received vision information, and stores the received vision information in the vision DB 117.

Next, at step S23, the management section 111 determines whether or not an instruction to end the service provided by the image control system 100 has been given; processing returns to step S21 in cases in which an instruction to end the service has not been given, and the second management processing ends in cases in which an instruction to end the service has been given.

Figure 24:
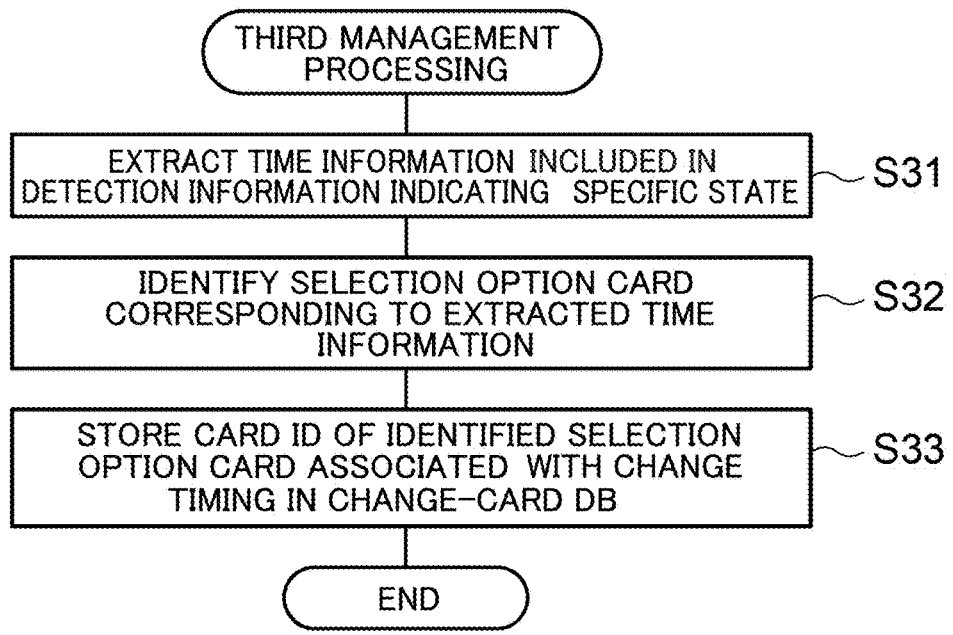
FIG. 24 is a flowchart illustrating an example of third management processing.

Next, explanation follows regarding the third management processing illustrated in FIG. 24. The third management processing is, for example, executed each time a workshop ends.

At step S31, the identification section 113 extracts, from the detection information stored in the detection information DB 118, time information included in detection information indicating a specific state.

Next, at step S32, the identification section 113 references the selection information DB 119 and identifies the card ID of a selection option card 10 that was selected at a timing corresponding to the time information extracted at step S31.

Next, at step S33, the identification section 113 associates a specific change timing with the card ID identified at step S32, and stores this in the change-card DB 115. The third management processing then ends.

Figure 25:
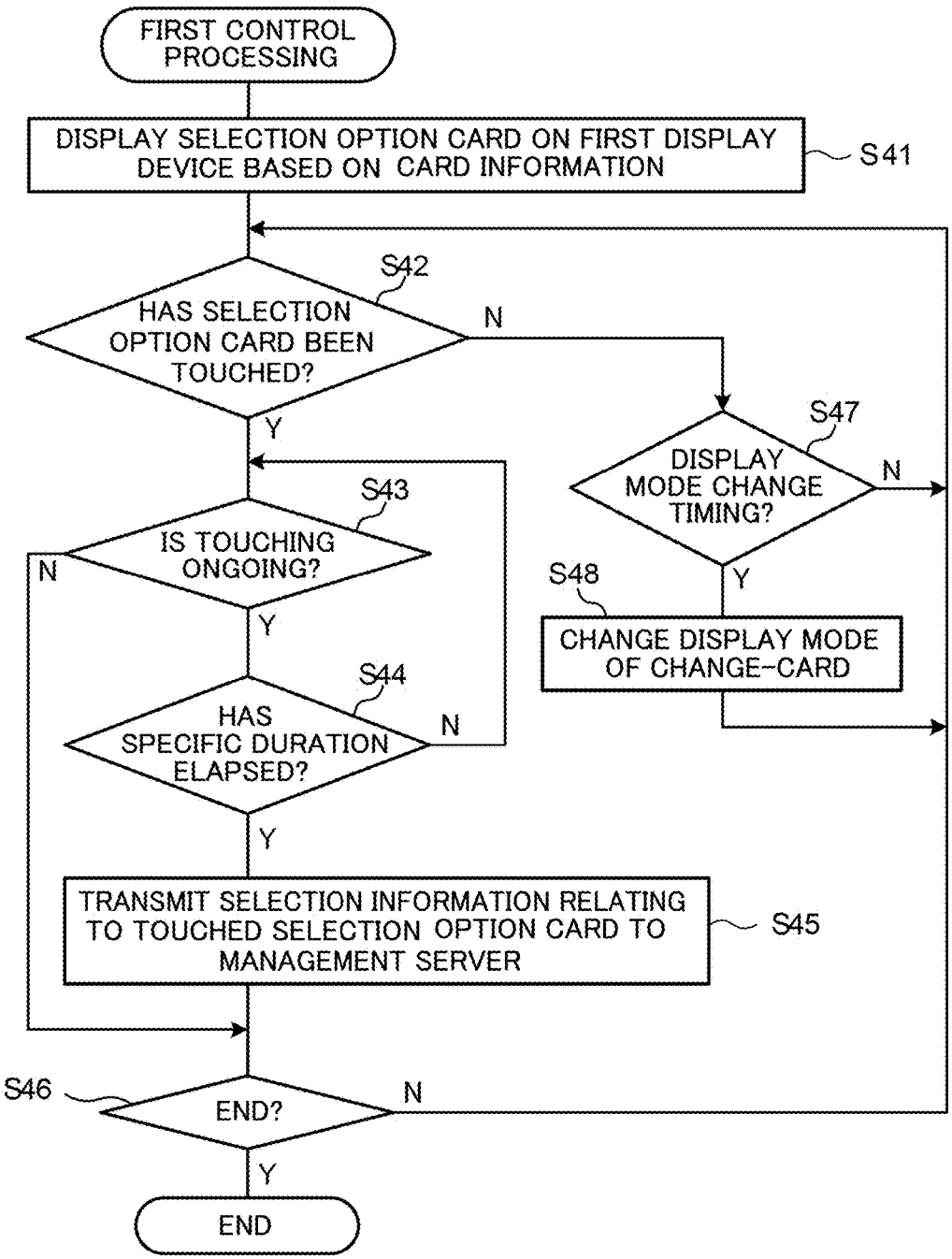
FIG. 25 is a flowchart illustrating an example of first control processing.

Next, explanation follows regarding the first control processing illustrated in FIG. 25. The first control processing initiates when the first control device 120 has received the card information and the change-card information transmitted from the management server 110.

At step S41, the display controller 121 controls such that each of the selection option cards 10 indicated in the received card information is displayed on the first display device 130.

Figure 26:
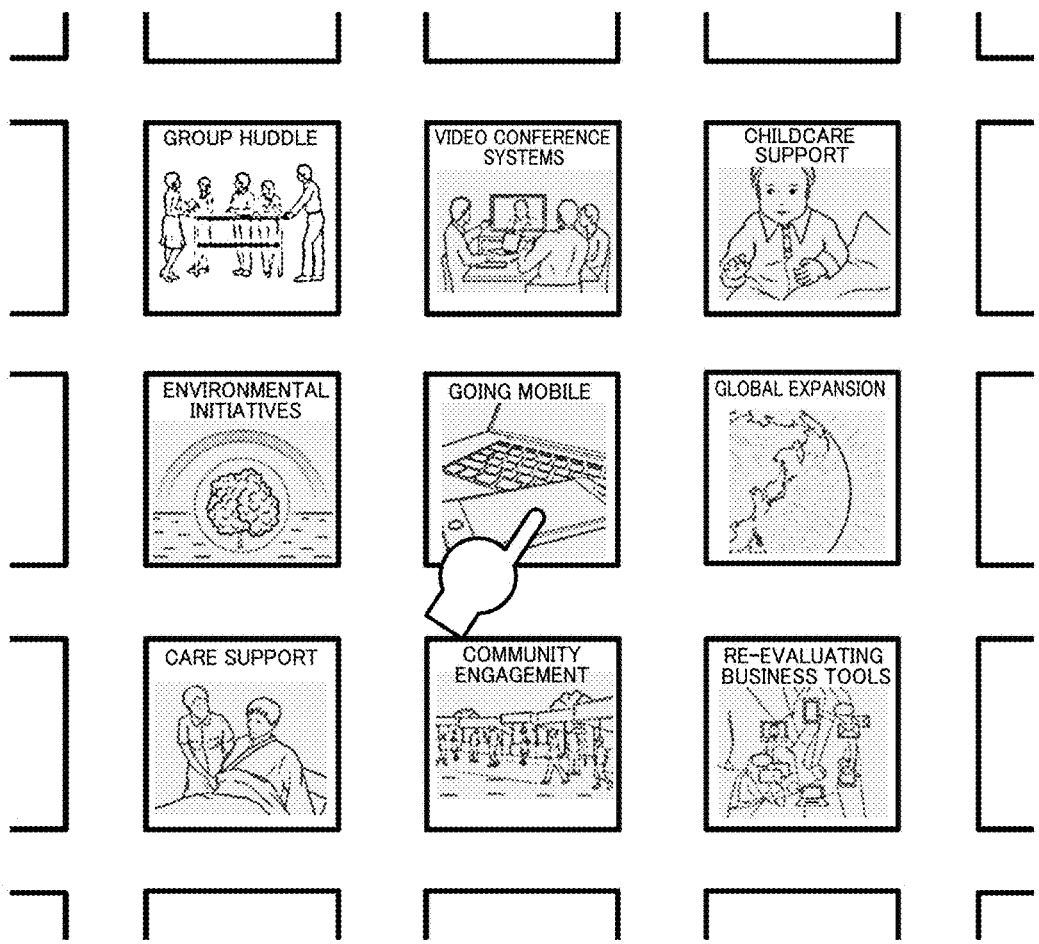
FIG. 26 is a diagram to explain selection of a selection option card.

Next, at step S42, the detector 122 determines whether or not a selection option card 10 displayed on the first display device 130 has been touched by a user 105. FIG. 26 illustrates an example of a portion of the display region of the first display device 130 in which the selection option cards 10 are displayed. As illustrated in FIG. 26, processing transitions to step S43 when touching of any of the selection option cards 10 by a user 105 has been detected.

At step S43, the detector 122 determines whether or not the touching of the selection option card 10 is ongoing. When touching is ongoing, processing transitions to step S44; when touching is not ongoing, processing transitions to step S46.

At step S44, the detector 122 determines whether or not the specific duration (for example 3 seconds) for the touch continuation duration of the selection option card 10 has elapsed. In cases in which the specific duration of the touch continuation duration has not elapsed, processing returns to step S43; in cases in which the specific duration of the touch continuation duration has elapsed, processing transitions to step S45.

At step S45, the detector 122 transmits selection information that the card ID of the touched selection option card 10 is associated with the time information indicating the timing at which the selection option card 10 was selected, to the management server 110. The card information corresponding to the selection information is forwarded to the second control device 140 and the third control device 160 by the forwarding section 112 of the management server 110 in the first management processing described above.

Next, at step S46, the display controller 121 determines whether or not an instruction to end the service provided by the image control system 100 has been given, and processing returns to step S42 in cases in which an instruction to end the service has not been given.

At step S42, processing transitions to step S47 in cases in which the detector 122 has not detected touching of a selection option card 10. At step S47, the display controller 121 references the received change-card information, and determines whether or not a change timing of any of the change-cards has arrived. In cases in which a change timing has arrived, processing transitions to step S48; in cases in which a change timing has not arrived, processing returns to step S42.

Figure 27:
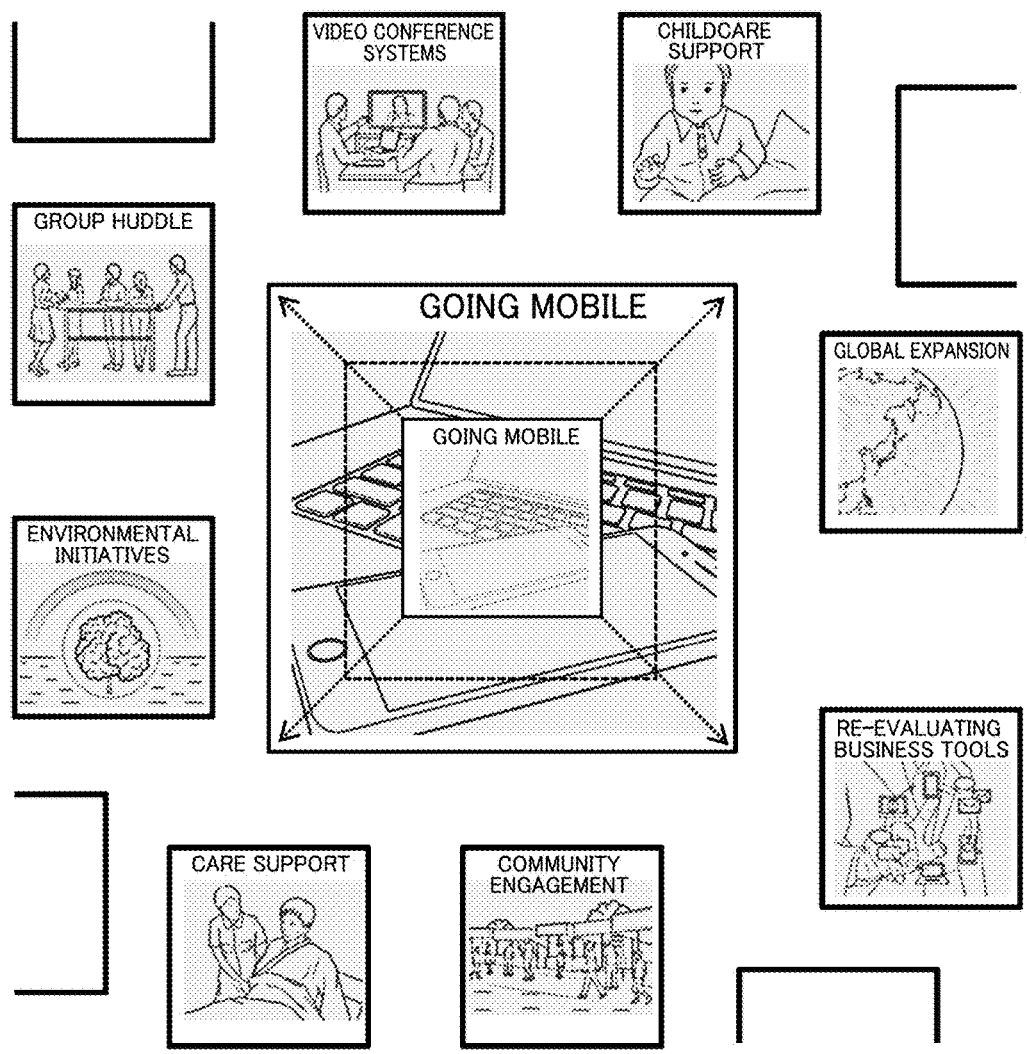
FIG. 27 is a diagram to explain changing a display mode of a change-card.

At step S48, the display controller 121 returns the change-card that is currently being displayed enlarged to its original display size and returns the display positions of the surrounding selection option cards 10 to their original positions. Then, as illustrated in FIG. 27, the display controller 121 enlarges, by the specific factor (for example, a factor of four), the display size of a change-card whose change timing has been determined to have arrived at step S47. Accompanying the enlarged display of the change-card, the display controller 121 also moves the display positions of the surrounding selection option cards 10 so as to avoid the change-card after enlarging display of the change-card, namely, such that the display does not overlap. Processing then returns to step S42.

At step S46 above, the first control processing ends in cases in which the display controller 121 has determined that an instruction to end the service provided by the image control system 100 has been given.

Figure 28:
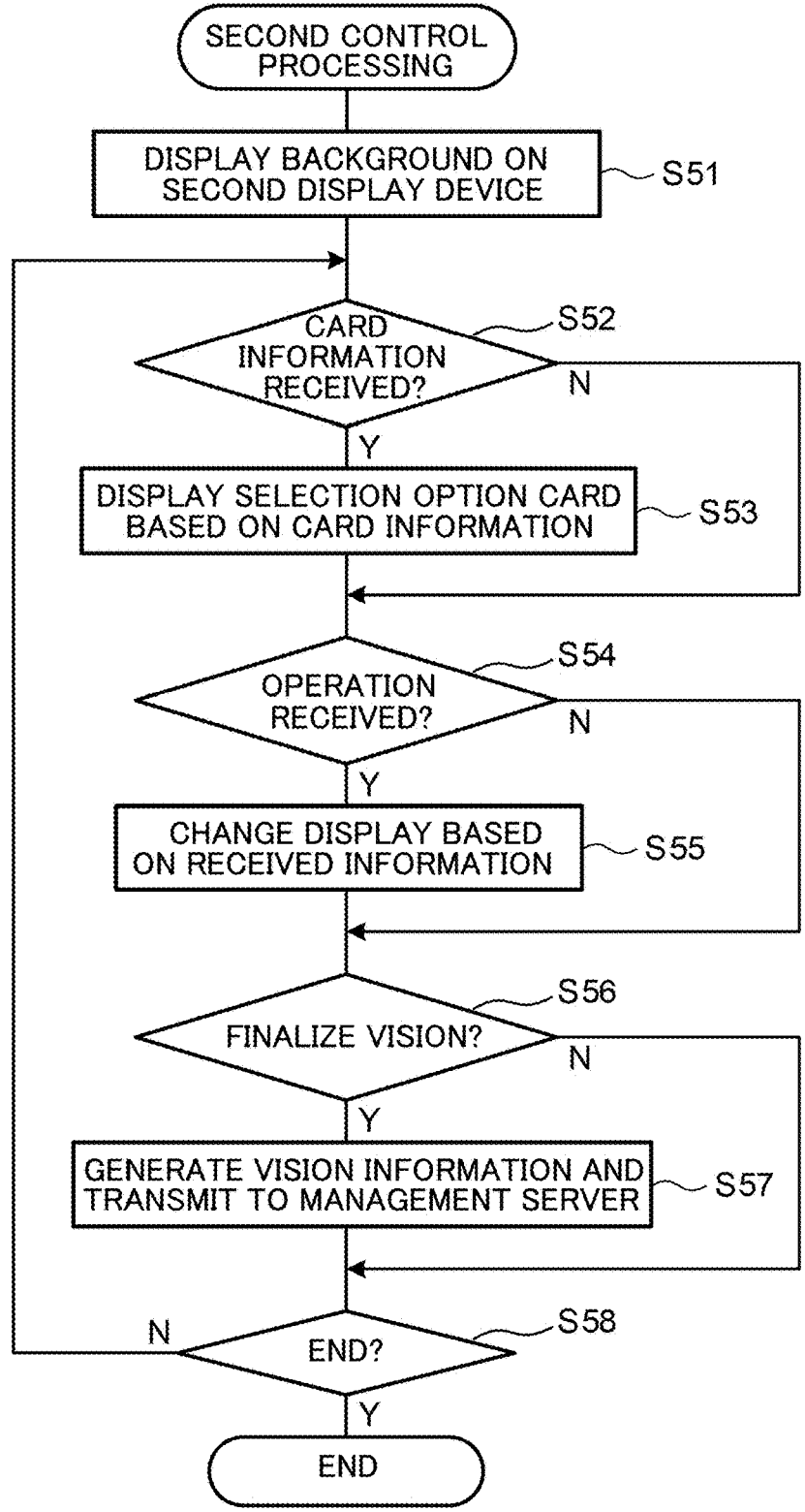
FIG. 28 is a flowchart illustrating an example of second control processing.

Next, explanation follows regarding the second control processing illustrated in FIG. 28. The second control processing initiates when the background information transmitted by the management server 110 has been received by the second control device 140.

At step S51, the display controller 141 displays the background 12 indicated by the received background information on the second display device 150. The displayed background 12 may be modifiable by instruction by a user 105. For example, in cases in which an instruction to modify the background 12 has been given, the second control device 140 requests the background information from the management server 110. The management server 110 then transmits background information that differs from the background information previously transmitted from the background DB 116 to the second control device 140.

Next, at step S52, the display controller 141 determines whether or not card information has been received from the management server 110. Processing transitions to step S53 in cases in which card information has been received. Here, the card information received is the card information of the selection option card 10 that, in the first management processing described above, was selected in the first display device 130, and which was forwarded by the management server 110. At step S53, the display controller 141 displays the selection option card 10 indicated by the received card information on the background 12, and processing transitions to step S54. However, in cases in which card information has not been received, the processing of step S53 is skipped, and processing transitions to step S54.

At step S54, the reception section 142 determines whether or not an operation by the user 105, such as modification of the display position or modification of the display size of the selection option card 10 displayed on the second display device 150, input of text data, or drawing using the handwriting tool, has been received. Processing transitions to step S55 in cases in which an operation has been received. At step S55, the reception section 142 notifies the display controller 141 with the received information indicating the contents of the received operation of the user 105. Then, the display controller 141 modifies the display position and display size of the selection option card 10, displays the input text data, displays the drawn image, or the like based on the received information; and processing transitions to step S56. However, in cases in which an operation of the user 105 has not been received, the processing of step S55 is skipped, and processing transitions to step S56.

Next, at step S56, the generation section 143 determines whether or not an instruction to finalize the vision has been given by a user 105. Processing transitions to step S57 in cases in which an instruction to finalize the vision has been given. At step S57, the generation section 143 acquires the display position of each of the selection option cards 10 on the background 12 displayed on the second display device 150. The generation section 143 then generates vision information including the background ID of the background 12 displayed on the second display device 150, the card IDs of the selection option cards 10, the acquired display position of each of the selection option cards 10, the input text data, and the drawn handwritten data. Moreover, the generation section 143 acquires the user group ID of the user group that generated the vision from the login information, the registration information employed when the system was used, or the like. The generation section 143 then appends the acquired user group ID to the generated vision information, transmits the generated vision to the management server 110, and processing then transitions to step S58. However, in cases in which finalization of the vision has not been instructed, the processing of step S57 is skipped and processing transitions to step S58.

At step S58, the reception section 142 determines whether or not an instruction to end the service provided by the image control system 100 has been given. Processing returns to step S52 in cases in which an instruction to end the service has not been given; otherwise, the second control processing ends in cases in which an instruction to end the service has been given.

Figure 29:
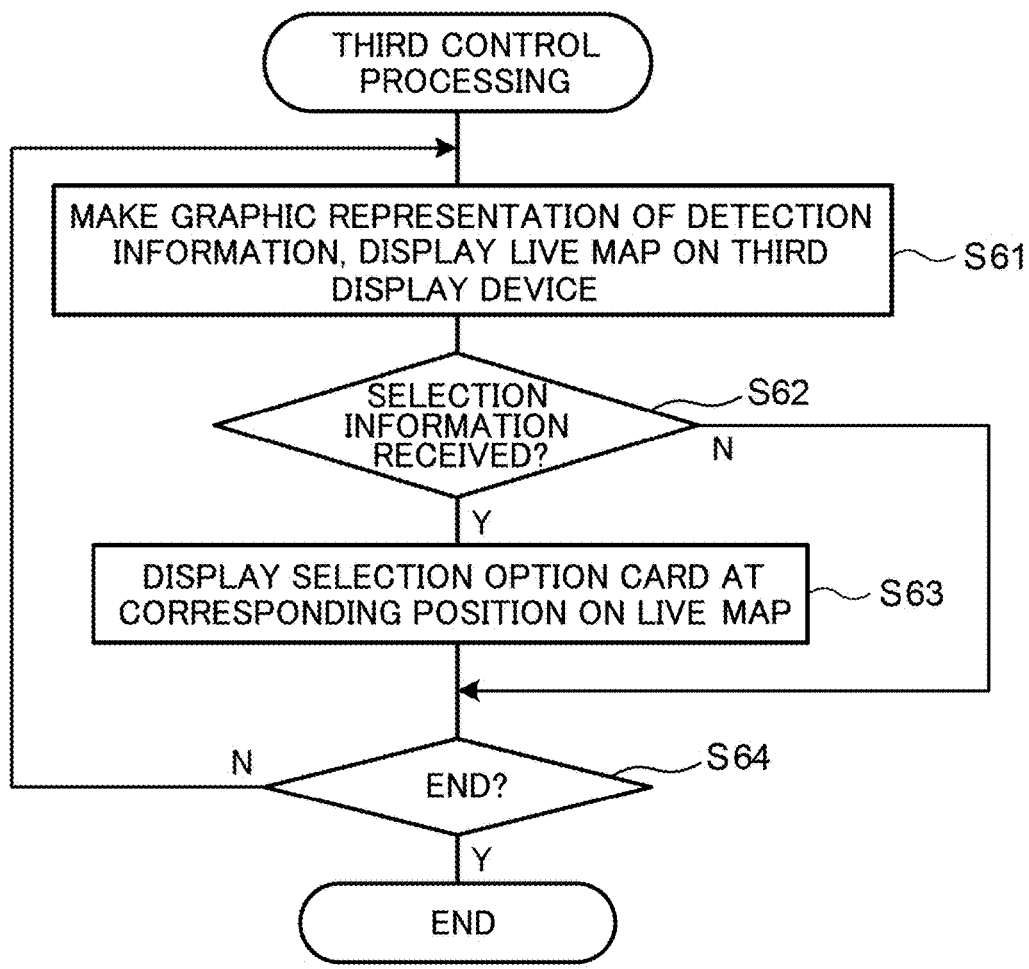
FIG. 29 is a flowchart illustrating an example of third control processing.

Next, explanation follows regarding the third control processing illustrated in FIG. 29. The third control processing initiates when the detection information transmitted from the management server 110 has been received by the third control device 160.

At step S61, the display controller 161 makes a graphic representation of the received detection information and displays the graphic representation as a live map on the third display device 170. Specifically, in cases in which the detection information (acoustic pressure and pulse rates) is displayed in graph form on the live map (see FIG. 6, for example), the display controller 161 displays additional portions representing the newly received detection information on graphs that are being displayed based on previously received detection information. In cases in which position information of the users 105 is displayed on a live map (see FIG. 7, for example), the display controller 161 calculates coordinate values on the layout diagram 14C corresponding to the position information received as the detection information. The display controller 161 displays the symbols 14D allocated to the respective users 105 at the calculated coordinate values.

Next, at step S62, the display controller 161 determines whether or not the selection information transmitted from the management server 110 (card ID and time information) and the card information of the selection option card 10 corresponding to the card ID included in the selection information have been received. In cases in which these have been received, processing transitions to step S63; in cases in which these have not been received, processing transitions to step S64.

At step S63, on the live map, the display controller 161 displays the selection option card 10 indicated by the received card information, so as to correspond with the detection information for when that selection option card 10 was selected. As illustrated in FIG. 6, in the live map expressing the detection information (acoustic pressure and pulse rates) as graphs, the display controller 161 displays the selection option card 10 indicated by the received card information at a position on the horizontal axis of the graph corresponding to the time information included in the selection information.

Next, at step S64, the display controller 161 determines whether or not an instruction to end the service provided by the image control system 100 has been given. Processing returns to step S61 in cases in which an instruction to end the service has not been given; otherwise, the third control processing ends in cases in which an instruction to end the service has been given.

Figure 30:
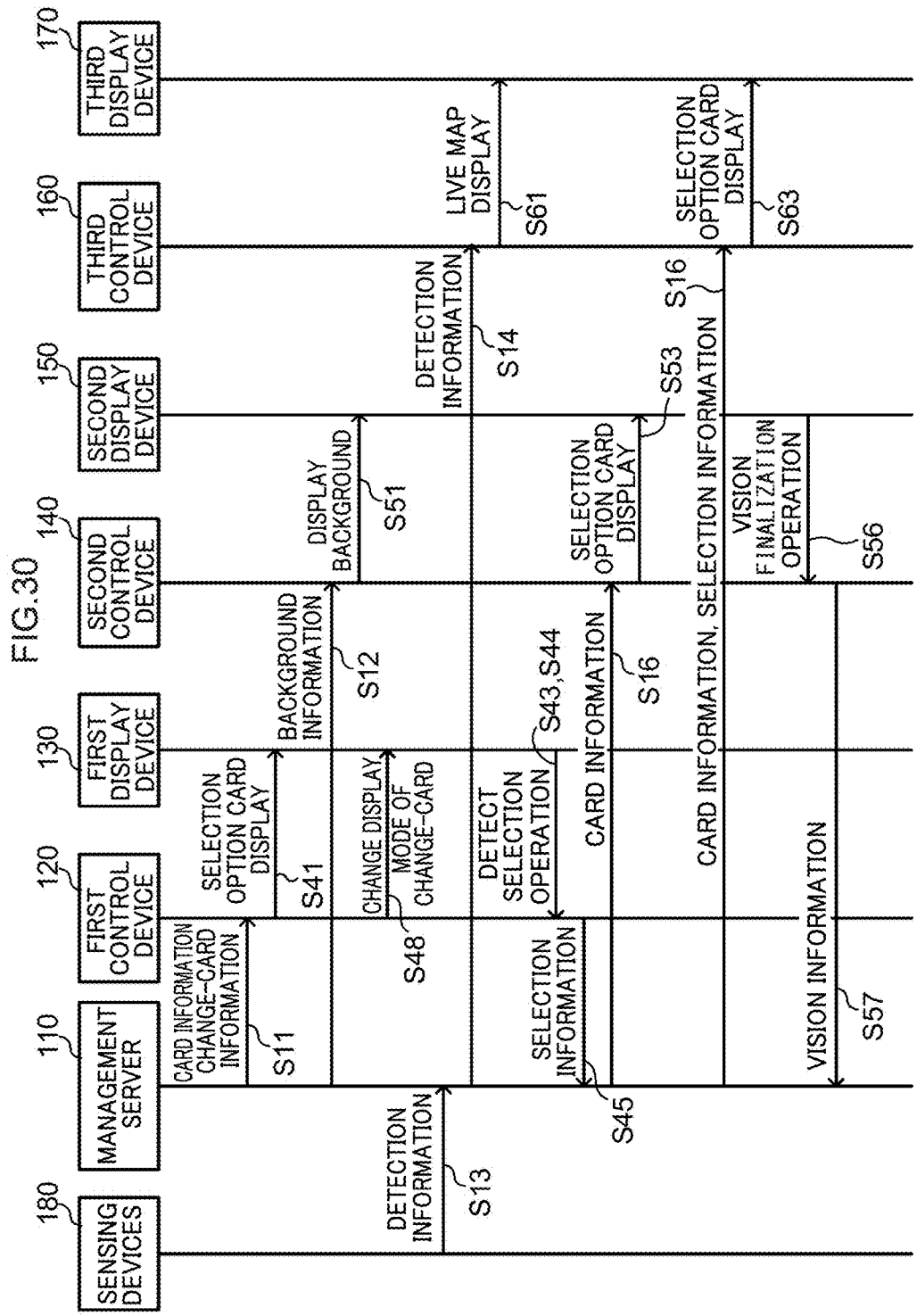
FIG. 30 is a sequence diagram illustrating exchange of information between respective devices.

Next, explanation follows regarding the exchange of information between each of the devices, with reference to the sequence diagram in FIG. 30. Note that in the explanation of the respective processing included in the sequence diagram in FIG. 30, processing that is the same as the processing explained in FIG. 22, FIG. 23, FIG. 24, FIG. 25, FIG. 28, and FIG. 29 is allocated the same reference numerals as those used in FIG. 22, FIG. 23, FIG. 24, FIG. 25, FIG. 28, and FIG. 29.

First, when an instruction has been given to initiate the service provided by the image control system 100, the management server 110 transmits the card information of the selection option cards 10 and the change-card information to the first control device 120 (S11). Then, the first control device 120 displays the selection option cards 10 on the first display device 130 based on the card information (S41). Moreover, the management server 110 transmits the background information to the second control device 140 (S12). The second control device 140 then displays the background 12 on the second display device 150 based on the background information (S51).

Based on the received change-card information, the first control device 120 changes the display mode of the change-card whose change timing has arrived (S48). Each time the change timing of a change-card arrives, the first control device 120 changes the display mode of that change-card.

The management server 110 acquires the detection information from the respective sensing devices 180 (S13), and transmits the acquired detection information to the third control device 160 (S14). When the third control device 160 has received the detection information, the third control device 160 displays a live map graphically representing the received detection information on the third display device 170 (S61).

The first control device 120 detects a selection operation of a selection option card 10 on the first display device 130 by a user 105 (S43, S44). When a selection operation has been detected, the first control device 120 transmits selection information that includes the card ID of the selected selection option card 10 and time information indicating the timing of the selection to the management server 110 (S45).

When the management server 110 has received the selection information, the management server 110 forwards card information corresponding to the card ID included in the selection information to the second control device 140 (S16). The management server 110 also forwards the card information and selection information to the third control device 160 (S16).

When the second control device 140 has received the card information, the second control device 140 displays the selection option card 10 on the second display device 150 based on the received card information (S53).

When the third control device 160 has received the card information and the selection information, the selection option card 10 is displayed at a corresponding position on the live map being displayed on the third display device 170, based on the received card information and the time information included in selection information (S63).

When a user 105 has given an instruction to finalize a vision on the second display device 150 (S56), the second control device 140 generates the vision information based on the background 12 and the selection option cards 10 displayed on the second display device 150, and transmits the generated vision information to the management server 110 (S57).

As described above, in the image control system 100 according to the present exemplary embodiment, states of the room in which a workshop is being held, or of the users participating in the workshop, are detected by the sensing devices. The change-card DB is stored with selection option cards selected at timings corresponding to times when detection information indicating a specific state, such as a state in which there is a lively exchange of speech, was detected, out of the detection information detected by the sensing devices. Then, out of the plural selection option cards displayed on the first display device, a change-card stored in the change-card DB is changed to a different display mode than the other selection option cards. This raises the likelihood of a selection option card whose presence had not been noticed by a user being noticed, enabling the users to be given a chance to consider various selection options.

The change-card display mode is changed to increase the visibility of the change-card in comparison to other selection option cards. Accordingly, a selection option card selected at a timing when the workshop had become lively, in other words, a selection option card that may be expected to generate excitement in the workshop, can be displayed in a manner that will attract the attention of the users to a greater degree.

Note that in the above exemplary embodiment, explanation has been given regarding an example in which acoustic pressure in the room, user position information, and user pulse rate are employed as the detection information. However, there is no limitation thereto. For example, detection values of acceleration sensors fitted to the users, or camera footage of the users may be used to detect user movement as detection information. In such cases, for example, a selection option card selected at a timing such as a timing at which a user stands up or a timing at which a user spreads their arms wide may be identified as the change-card whose display mode is to be changed. Moreover, a selection option card selected at a timing at which a predetermined keyword appears in speech recognition results for speech content of a user may be identified as a change-card in cases in which speech recognition is performed on user speech detected by a microphone.

In the above exemplary embodiment, the change-cards subject to display mode change may be identified according to the goal of the workshop or according to attributes of the user group participating in the workshop. In such cases, the change-card DB is prepared for each workshop goal or for each attribute of the user group participating in the workshop. When transmitting change-card information from the management server to the first control device, change-card information acquired from the change-card DB corresponding to a workshop that is about to be held may be transmitted.

Figure 31:
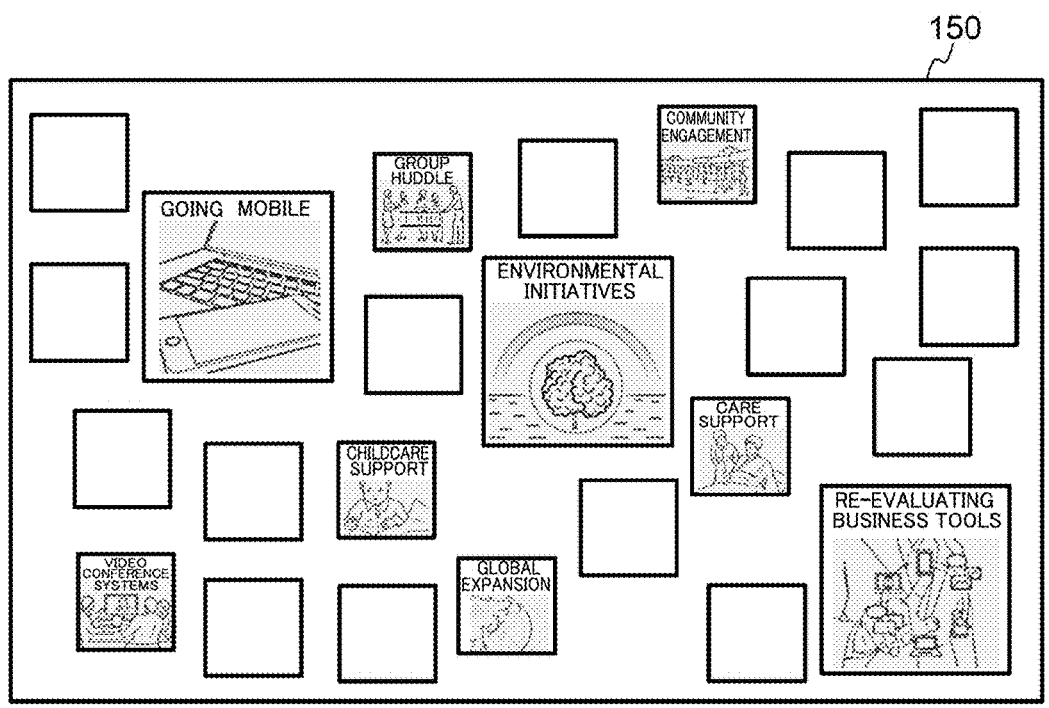
FIG. 31 is a diagram to explain changing a display mode of a change-card.

Moreover, in the above exemplary embodiment, explanation has been given regarding a case in which the change timings of the respective change-cards are set at a specific time interval. However, the manner in which the change timing is set is not limited to this example. For example, at step S41 in the first control processing illustrated in FIG. 25, at the point when a selection option card is initially displayed on the first display device, as illustrated in FIG. 31, display may be performed after changing the display mode of all of the change-cards (three cards in the example of FIG. 31). In such cases, the "change timing" field may be omitted from the change-card DB. Moreover, when a selection option card is selected, the elapsed time from the start of the workshop may be used as-is as the change timing. Namely, in cases in which a selection option card was selected at a point five minutes from the start of the workshop in a past workshop is identified as a change-card, the display mode of that change-card is changed five minutes after the start of display on the first display device.

Figure 32:
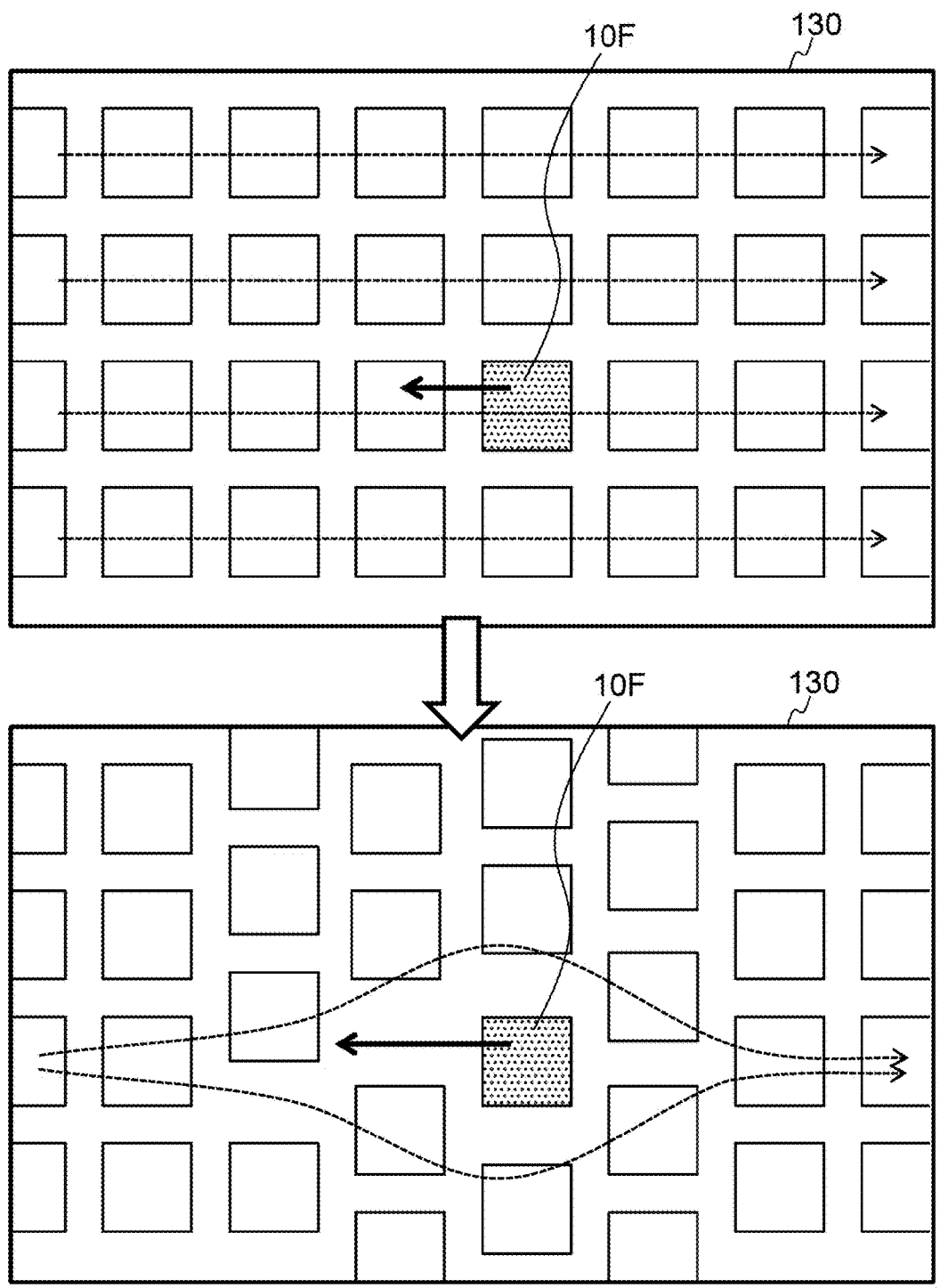
FIG. 32 is a diagram to explain movement of a selection option card.

Moreover, the change to the display mode of the change-card is not limited to the example in the above exemplary embodiment. For example, as illustrated in the upper part of FIG. 32, when the selection option cards are displayed on the first display device, plural of the selection option cards 10 are all moved toward the right, toward the left, upward, or downward (toward the right in the example in FIG. 32). Then, a change-card whose change timing has arrived (10F in the example of FIG. 32) is moved in the opposite direction to, or a direction intersecting, the overall movement direction (the operation direction in the example in FIG. 32). Accompanying this movement, the selection option cards 10 around the change-card 10F are moved so as to avoid the change-card 10F, as illustrated in the bottom part of FIG. 32.

Information related to movement of each of the selection option cards 10 is stored in the card DB for the purpose of implementing the above-described movement of the selection option cards 10. An example of a card DB 214 is illustrated in FIG. 33. In the example of FIG. 33, information similar to the display position of the card DB 114 of the present exemplary embodiment is stored as an "initial display position", in association with the "card ID" of each of the selection option cards 10. Moreover, "movement information" indicating how each of the selection option cards 10 is moved is stored in association with the card IDs. Movement information may, for example, be information including a movement direction and a movement speed, such as "move in a specific direction (for example, the positive direction of the x-axis) by a specific number of pixels (for example, one pixel) each cycle".

As illustrated in FIG. 34, a change-card DB 215 is stored with "movement information" for after the display mode has been changed. Note that movement information indicating that the change-card is to be displayed in a static state may be stored as the "movement information" for after the display mode has been changed. In such cases, the change-card still attracts attention easily since the movement of the change-card is stopped while the other selection option cards are still moving.

The display controller 121 of the first control device 120 controls the first display device 130 so as to receive the card information transmitted from the management server 110, and display each of the selection option cards 10 indicated by the card information at the display position indicated by the "initial display position". Moreover, the display controller 121 moves the respective selection option cards 10 based on the "movement information". Moreover, as the change in display mode for a change-card whose change timing has arrived, based on the change-card information, the display controller 121 changes the movement direction and movement speed of the change-card. Moreover, accompanying the changes in movement direction and movement speed of the change-card, the display controller 121 moves the surrounding selection option cards 10 so as to avoid the change-card. Known image placement optimization technology or the like may be employed to move the surrounding selection option cards 10 in keeping with this avoidance.

Moreover, plural second display devices may be provided in the exemplary embodiment above. In such cases, a different background is displayed on each second display device. Then, when a selected selection option card selected from the first display device is forwarded to the second display device, forwarding is performed after selecting which second display device to forward to. This, for example, enables different visions to be displayed on different second display devices, such as a vision of a current state of affairs and a vision of future hopes.

Moreover, in the exemplary embodiment above, plural first display devices may be provided, and the plural first display devices may be coordinated to function as a single large display. In such cases, a greater amount of selection option cards can be displayed.

In the exemplary embodiment above, handwritten notes and the like may be read by a scanner and displayed on the second display device in an electronic card format similar to that of the selection option cards. This enables information not included in the selection options expressed by the selection option cards to be reflected in the vision.

Although explanation has been given in the exemplary embodiment above regarding cases in which the first control device 120 controls display on the first display device 130, the second control device 140 controls display on the second display device 150, and the third control device 160 controls display on the third display device 170, there is no limitation thereto. For example, the management server 110 may control display on the first display device 130, the second display device 150, and the third display device 170. In such cases, each functional section of the first control device 120, each functional section of the second control device 140, and each functional section of the third control device 160 may be provided by the management server 110.

Note that the identification section 113 of the management server 110 in the above exemplary embodiment is an example of an identification section of technology disclosed herein; and the respective display controllers 121, 141, 161 of the first control device 120, the second control device 140, and the third control device 160 are examples of controllers of technology disclosed herein.

Although explanation has been given in the exemplary embodiment above regarding modes in which the management program 30, the first control program 50, the second control program 70, and the third control program 90 are pre-stored (installed) in the storage sections 23, 43, 63, 83, there is no limitation thereto. The program according to technology disclosed herein may be provided in a format recorded to a storage medium such as a CD-ROM, a DVD-ROM, or USB memory.

When user desires are extracted and products and services are provided according to their desires, only products and services that partially satisfy user desires can be provided in cases in which only fragmentary user desires are extracted. It is, therefore, important to extract a full account of desires, such as future visions and concepts drawn up by users using free imagination, without being swayed by the products and services being provided. However, operations that strictly extract such visions and concepts involve consulting, which entails time and costs.

In order to address this, various selection options that aid extraction of user desires are presented to the user by displaying keywords, illustrations, or the like; and the user chooses a selection option having content that matches their desires. A conceivable method is one in which the provider of a product or service takes selection options chosen by users as material to consider in order to infer user desires, and provides a product or service conforming to user desires.

One aspect has the advantageous effect of enabling plural selection options to be displayed such that a user can be made aware of the existence of various selection options.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image control method, comprising:
    receiving, using a display device displaying a plurality of items of selection option information, a selection operation by a user of an item of the selection option information, and storing, in a first storage section, the selected item of the selection option information in association with a timing at which the selection operation for the selection option information is receive;
    detecting, using a detection device, detection information indicating at least one of a state of an area at which the display device is disposed or a state of a user present in the area at which the display device is disposed, and storing, in a second storage section, the detection information in association with time information indicating a time at which the detection information is detected;
    extracting, by a processor, from the second storage section, time information that is associated with detection information indicating that at least one of the area or the user is in a predetermined state;
    identifying, by the processor, an item of the selection option information stored at the first storage section in association with a timing that corresponds to the time information stored at the second storage section;
    associating, by the processor, a change timing with the identified item of the selection option information, and storing the identified item of the selection option information and the associated change timing in a third storage section;
    determining, by the processor, whether the change timing of any of the plurality of items of the selection option information displayed on the display device has arrived, by referencing the third storage section; and
    effecting control by the processor so as to display, on the display device, the item of the selection option information having the change timing associated therewith determined to have arrived, using a different display mode from that of other displayed items of the selection option information.

2. The image control method of claim 1, wherein the detection information includes at least one of acoustic pressure in the area, a pulse rate of the user, speech content of the user, movement of the user, or position information on the user.

3. The image control method of claim 2, further comprising, when identifying the item of the selection option information:
    in a case in which the detection information is the acoustic pressure in the area, identifying an item of the selection option information for which a selection operation is received at a timing corresponding to time information indicating a time at which acoustic pressure of a specific value or greater is detected;
    in a case in which the detection information is the pulse rate of the user, identifying an item of the selection option information for which a selection operation is received at a timing corresponding to time information indicating a time at which a pulse rate of a specific value or greater is detected;
    in a case in which the detection information is the speech content of the user, identifying an item of the selection option information for which a selection operation is received at a timing corresponding to time information indicating a time at which speech containing a predetermined keyword is detected;
    in a case in which the detection information is the movement of the user, identifying an item of the selection option information for which a selection operation is received at a timing corresponding to time information indicating a time at which movement greater than a predetermined magnitude is detected; and
    in a case in which the detection information is the position information on the user, identifying an item of the selection option information for which a selection operation is received at a timing corresponding to time information indicating a time at which a user position, movement path, or movement speed satisfying a specific condition is detected.

4. The image control method of claim 1, wherein the item of the selection option information displayed using a different display mode from that of the other displayed items of the selection option information is displayed using a display mode that has greater visibility than that of the other displayed items of the selection option information.

5. The image control method of claim 1, wherein:
    a goal of a workshop held using the plurality of items of selection option information, or an attribute of a user group holding the workshop, is stored respectively in association with the selection option information and the timing stored at the first storage section, and in association with the detection information and the time information stored at the second storage section; and
    when displaying the plurality of items of selection option information on the display device, the selection option information and the timing stored at the first storage section in association with the goal of the workshop held using the plurality of items of selection option information, or in association with the user group holding the workshop, and the detection information and the time information stored at the second storage section, are referenced to identify the item of the selection option information to be displayed using a different display mode from that of the other displayed items of the selection option information.

6. The image control method of claim 1, wherein, in a case in which there is a plurality of items of the selection option information to be displayed using a different display mode from that of the other displayed items of the selection option information:
- a timing that makes the display mode differ from that of the other displayed items of the selection option information is set so as to be the same timing for each of the plurality of items of the selection option information to be displayed using a different display mode; or
- timings are set so as to differ from each other according to the timings at which selection operations are respectively received for the plurality of items of the selection option information to be displayed using a different display mode.

7. The image control method of claim 1, further comprising displaying a graphic representation of a relationship between the detection information and the time information on a display device.

8. The image control method of claim 1, wherein the other displayed items of the selection option information are respectively displayed so as to move in an up-down direction or a left-right direction on the display device, and the item of the selection option information displayed using a different display mode from that of the other displayed items of the selection option information is displayed in a stationary state, is displayed so as to move in an opposite direction to the direction in which the other displayed items of the selection option information are moving, or is displayed so as to move in a direction intersecting the direction in which the other displayed items of the selection option information are moving.

9. The image control method of claim 1, further comprising displaying, on another display device, the selection option information for which a selection operation on the display device is received.

10. An image control device, comprising:
a memory; and
a processor coupled to the memory, the processor configured to:
- receive, using a display device displaying a plurality of items of selection option information, a selection operation by a user of an item of the selection option information, and store, in a first storage section, the selected item of the selection option information in association with a timing at which the selection operation for the selection option information is received;
- detect, using a detection device, detection information indicating at least one of a state of an area at which the display device is disposed or a state of a user present in the area at which the display device is disposed, and store, in a second storage section, the detection information in association with time information indicating a time at which the detection information is detected;
- extract, from the second storage section, time information that is associated with detection information indicating that at least one of the area or the user is in a predetermined state;
- identify an item of the selection option information stored at the first storage section in association with a timing that corresponds to the extracted time information from the second storage section;
- associate a change timing with the identified item of the selection option information, and store the identified item of the selection option information and the associated change timing in a third storage section;
- determine whether the change timing of any of the plurality of items of the selection option information displayed on the display device has arrived, by referencing the third storage section: and
- display, on the display device, the item of the selection option information having the change timing associated therewith determined to have arrived, using a different display mode from that of other displayed items of the selection option information.

11. The image control device of claim 10, wherein the detection information includes at least one of acoustic pressure in the area, a pulse rate of the user, speech content of the user, movement of the user, or position information on the user.

12. The image control device of claim 10, wherein the item of the selection option information displayed using a different display mode from that of the other displayed items of the selection option information is displayed using a display mode that has greater visibility than that of the other displayed items of the selection option information.

13. The image control device of claim 10, wherein:
- a goal of a workshop held using the plurality of items of selection option information, or an attribute of a user group holding the workshop, is stored respectively in association with the selection option information and the timing stored at the first storage section, and in association with the detection information and the time information stored at the second storage section; and
- the image control device further comprises an identification section that, when displaying the plurality of items of selection option information on the display device, references the selection option information and the timing stored at the first storage section in association with the goal of the workshop held using the plurality of items of selection option information, or in association with the user group holding the workshop, and the detection information and the time information stored at the second storage section, to identify the item of the selection option information to be displayed using a different display mode from that of the other displayed items of the selection option information.

14. The image control device of claim 10, wherein, in a case in which there is a plurality of items of the selection option information to be displayed using a different display mode from that of the other displayed items of the selection option information:
- a timing that makes the display mode differ from that of the other displayed items of the selection option information is set so as to be the same timing for each of the plurality of items of the selection option information to be displayed using a different display mode, or
- timings are set so as to differ from each other according to the timings at which selection operations are respectively received for the plurality of items of the selection option information to be displayed using a different display mode.

15. The image control device of claim 10, wherein the processor is further configured to display a graphic representation of a relationship between the detection information and the time information on a display device.

16. The image control device of claim 10, wherein the processor is further configured to display, on another display device, the selection option information for which a selection operation on the display device is received.

17. An image control system comprising:
a first display device that displays a plurality of items of selection option information and receives a selection operation by a user of an item of the selection option information;
a management device including:
a memory; and
a processor coupled to the memory, the processor being configured to:
store, in a first storage section, the selected item of the selection option information in association with a timing at which the selection operation for the selection option information is received;
detect, using a detection device, detection information indicating at least one of a state of an area at which the first display device is disposed or a state of a user present in the area at which the first display device is disposed, and store, in a second storage section, the detection information in association with time information indicating a time at which the detection information is detected;
extract, from the second storage section, time information that is associated with detection information indicating that at least one of the area or the user is in a predetermined state;
identify an item of the selection option information stored at the first storage section in association with a timing that corresponds to the extracted time information from the second storage section;
associate a change timing with the identified item of the selection option information, and store the identified item of the selection option information and the associated change timing in a third storage section; and
determine whether the change timing of any of the plurality of items of the selection option information displayed on the display device has arrived, by referencing the third storage section; and
a first control device including:
a memory; and
a processor coupled to the memory of the first control device, the processor being configured to display, on the first display device, the item of selection option information having the change timing associated therewith determined by the management device to have arrived, using a different display mode from that of other displayed items of the selection option information.

18. The image control system of claim 17, further comprising:
a second display device; and
a second control device, wherein:
the first control device forwards, to the second control device, the selection option information for which the selection operation is received on the first display device, and
the second control device includes:
a memory; and
a processor coupled to the memory, the processor configured to effect control such that the forwarded selection option information is displayed on the second display device.

19. The image control system of claim 18, further comprising:
a third display device; and
a third control device, wherein:
the first control device forwards the detection information and the time information to the third control device, and
the third control device includes:
a memory; and
a processor coupled to the memory, the processor configured to effect control such that a graphic representation of the relationship between the forwarded detection information and the time information is displayed on the third display device.

* * * * *